(12) United States Patent
Bahn et al.

(10) Patent No.: US 10,844,808 B2
(45) Date of Patent: Nov. 24, 2020

(54) ROCKET ENGINE SYSTEMS WITH AN INDEPENDENTLY REGULATED COOLING SYSTEM

(71) Applicants: Patrick R. E. Bahn, Washington, DC (US); Earl W. Renaud, Ottawa (CA)

(72) Inventors: Patrick R. E. Bahn, Washington, DC (US); Earl W. Renaud, Ottawa (CA)

(73) Assignee: TGV ROCKETS, Washington, DC (US)

( * ) Notice: Subject to any disclaimer, the term of this patent is extended or adjusted under 35 U.S.C. 154(b) by 321 days.

(21) Appl. No.: 15/786,465

(22) Filed: Oct. 17, 2017

(65) Prior Publication Data

US 2018/0238271 A1  Aug. 23, 2018

Related U.S. Application Data

(63) Continuation of application No. 13/844,731, filed on Mar. 15, 2013, now abandoned.

(51) Int. Cl.
  *F02K 9/42* (2006.01)

(52) U.S. Cl.
  CPC ............ *F02K 9/42* (2013.01); *F05D 2260/20* (2013.01)

(58) Field of Classification Search
  CPC ........ B64G 1/002; B64G 1/401; B64G 1/402; B64D 27/023; F02K 9/64; F02K 9/972; F02K 9/42; F02K 9/46
  See application file for complete search history.

(56) References Cited

U.S. PATENT DOCUMENTS

| | | | | |
|---|---|---|---|---|
| 2,743,577 A * | 5/1956 | Malick | ...................... | F02K 9/56 60/39.091 |
| 3,098,353 A * | 7/1963 | Abild | ........................ | F02K 9/50 60/39.27 |
| 3,449,178 A * | 6/1969 | Tarpley, Jr. | ........... | C06B 23/001 149/17 |
| 3,910,037 A * | 10/1975 | Salkeld | ..................... | F02K 9/44 60/250 |
| 3,955,784 A * | 5/1976 | Salkeld | .................... | B64G 1/14 244/171.1 |
| 4,073,138 A * | 2/1978 | Beichel | ..................... | F02K 9/48 60/245 |
| 4,223,530 A * | 9/1980 | Kirner | ...................... | F02K 9/48 60/204 |
| 4,771,599 A * | 9/1988 | Brown | ...................... | F02K 9/42 239/419.3 |
| 4,771,600 A * | 9/1988 | Limerick | .................. | F02K 9/42 60/258 |

(Continued)

OTHER PUBLICATIONS

Matthew J. Casiano, et al. Liquid-Propelleant Rocket Engine Throttling: A Comprehensive Review. Journal of Propulsion and Power, vol. 26, No. 5, Sep.-Oct. 2010, pp. 897-923. Accessible at: https://arc.aiaa.org/doi/pdf/10.2514/1.49791, accessed Apr. 4, 2017 (Year: 2010).*

*Primary Examiner* — Philip J Bonzell

(57) ABSTRACT

An improved rocket engine system comprises a rocket engine, a coolant source, and a propellant source, which are in fluid communication with the rocket engine with independent regulation of the coolant source flow relative to the propellant source flow. The improved rocket engine system may further include at least one power source, at least one power source motor, at least one pump, at least one controller, and a propellant pressurizing source.

18 Claims, 10 Drawing Sheets

(56) References Cited

U.S. PATENT DOCUMENTS

| | | | | |
|---|---|---|---|---|
| 4,831,818 A * | 5/1989 | Martin | ............... | F02K 9/48 |
| | | | | 60/204 |
| 6,457,306 B1 * | 10/2002 | Abel | ............... | B64G 1/401 |
| | | | | 417/16 |
| 6,619,031 B1 * | 9/2003 | Balepin | ............... | B64G 1/401 |
| | | | | 60/246 |
| 9,139,311 B2 * | 9/2015 | Salkeld | ............... | B64G 1/14 |
| 9,340,299 B2 * | 5/2016 | Yates | ............... | B64D 39/00 |
| 9,650,138 B2 * | 5/2017 | Yates | ............... | B64D 33/00 |
| 9,677,503 B2 * | 6/2017 | Bahn | ............... | F02K 9/72 |
| 9,815,563 B2 * | 11/2017 | Yates | ............... | B64D 39/00 |
| 2003/0046923 A1 * | 3/2003 | Dressler | ............... | F02K 9/52 |
| | | | | 60/258 |
| 2009/0288390 A1 * | 11/2009 | Pavia | ............... | F02K 9/64 |
| | | | | 60/267 |
| 2014/0083081 A1 * | 3/2014 | Bahn | ............... | B64G 1/52 |
| | | | | 60/251 |
| 2014/0339371 A1 * | 11/2014 | Yates | ............... | B64D 27/24 |
| | | | | 244/53 R |
| 2016/0031564 A1 * | 2/2016 | Yates | ............... | B64D 33/00 |
| | | | | 307/9.1 |
| 2016/0288918 A1 * | 10/2016 | Yates | ............... | B64C 39/024 |
| 2018/0128208 A1 * | 5/2018 | Bahn | ............... | B64G 1/52 |
| 2018/0238272 A1 * | 8/2018 | Renaud | ............... | F02K 9/425 |

* cited by examiner

ROCKET ENGINE SYSTEMS WITH AN INDEPENDENTLY REGULATED COOLING SYSTEM

CROSS-REFERENCE TO RELATED APPLICATION

The present application is a continuation of U.S. patent application Ser. No. 13/844,731, filed Mar. 15, 2013, and published as U.S. Patent Application Publication 2014/0260186 on Sep. 18, 2014, which is incorporated herein by reference in its entirety.

FIELD OF THE INVENTION

The present invention relates generally to rockets, rocket engines, and cooling systems relating to rocket pump motors and rocket engines. More specifically, the present invention relates to improved rocket engine systems with an independently regulated cooling system.

BACKGROUND OF THE INVENTION

Rockets, rocket engines, and cooling systems relating to rocket pump motors and rocket engines are known in the art. The following patent documents below disclose and show some of these examples.

U.S. Pat. No. 6,052,987, issued to Dressler on Apr. 25, 2000, discloses space craft's rocket engines that are cooled by a recirculating cooling system containing a non-propellant coolant fluid, such as water and/or ethylene glycol. With that recirculating cooling system to maintain the rocket engine combustion chamber at a lower temperature, spacecraft rocket engines may be constructed less expensively and can operate with greater safety by employing the more common metals in their construction. The cooling system also provides an easy means to warm and/or vaporize a propellant.

U.S. Patent Application Publication No. 20100300065, published to Balepin on Dec. 2, 2010, discloses closed-cycle rocket engine assemblies that include a combustor assembly, a combustor jacket, a turbine, a first pump and a mixing chamber. The combustor jacket facilitates the transfer of heat from the combustor assembly into a fluid and the turbine is driven by a heated fluid from the combustor jacket. The mixing chamber may include a first inlet to receive a fluid from the turbine, a second inlet to receive a fluid from a first reactant reservoir, and an outlet to deliver a fluid to the first pump. Additionally, the first pump may be coupled to and powered by the turbine and the first pump may be configured to deliver at least a portion of the fluid from the mixing chamber into the combustion chamber of the combustor assembly. Related methods of operating such rocket engine assemblies are also disclosed.

U.S. Pat. No. 7,784,269, issued to Greason, et al. on Aug. 31, 2010, discloses a propulsion system for a rocket engine and a method of cooling a rocket engine that includes a propellant tank fluidically coupled to the rocket engine to hold a pressurized propellant, a coolant tank to hold a coolant, a first heat exchanger thermally coupled to the rocket engine and fluidically coupled to the coolant tank, a second heat exchanger thermally coupled to the propellant tank and fluidically coupled to the first heat exchanger, and a third heat exchanger disposed inside the propellant tank to thermally couple a propellant withdrawn from the tank for combustion to a propellant disposed inside the tank. The coolant flows from the coolant tank to the first heat exchanger and through the first heat exchanger to cool the rocket engine. The propellant withdrawn from the propellant tank receives heat from the propellant disposed inside the tank through the third heat exchanger to convert to a gaseous propellant when withdrawn from the propellant tank as a liquid propellant. The coolant flows from the first heat exchanger to the second heat exchanger and through the second heat exchanger to heat the propellant disposed inside the propellant tank.

U.K./G.B. Patent Specification Publication No. 792,909, published to Halford, et al. on Apr. 2, 1958, discloses a cooling system for the combustion chamber of a rocket motor using liquid propellants comprises a cooling jacket around the combustion chamber, means for circulating a liquid coolant through this jacket, and a heat exchanger through which the coolant is also circulated and wherein the coolant gives up heat to a propellant liquid.

U.S. Patent Application Publication No. 20090288390, published to Pavia, et al. on Nov. 26, 2009, discloses, in some implementations, a propulsion system that includes a thrust chamber having a gap between an inner shell and an outer shell, the inner shell and the outer shell being attached together to form the thrust chamber. In some implementations, the rocket engine also includes a recirculating cooling system operably coupled to the gap in at least two locations and operable to recirculate a convective coolant through the gap.

U.S. Patent Application Publication No. 20110005193, published to Pavia, et al. on Jan. 13, 2011, discloses methods and apparatuses that improve the ease of fabrication and delivered specific impulse performance of simplified rocket engine thrust chambers. Included are a method and apparatus for a pool-boiling cooling system rocket thrust chamber. This cooling system utilizes a convective coolant flowing in a continuous or semi-continuous coolant loop. In addition the convective coolant itself is cooled in a pool-boiling heat exchanger by the evaporation of a propellant that functions as a boiling coolant. The invention also includes a method and apparatus for a shortened, simplified, conical expansion nozzle for a rocket thrust chamber that can operate with reduced specific impulse losses due to nozzle configuration and the use of film coolant in the thrust chamber.

U.S. Pat. No. 6,769,242, issued to Balepin on Aug. 3, 2004, discloses a coolant system for a rocket engine. The rocket engine includes an injector, a fuel supply, an oxidizer supply, a pump for feeding fuel from the fuel supply to the injector, a pump for feeding oxidizer from the oxidizer supply to the injector, a combustor, and a nozzle, the combustor and nozzle forming a combustor and nozzle assembly. The coolant system includes a cooling jacket surrounding the combustor and nozzle assembly. A coolant fluid is supplied to the combustor jacket by a coolant pump that circulates the coolant fluid through the jacket. The coolant fluid vaporizes to cool the combustor and nozzle assembly. A turbine is operatively connected to the coolant pump and is driven by the vaporized coolant from the jacket. A heat exchanger transfers heat from the vaporized fluid to fuel or oxidizer from the supply thereof prior to the feeding of the fuel or oxidizer into the injector. The vaporized coolant fluid is condensed in the turbine and heat exchanger for recirculation to the combustor and nozzle assembly jacket.

U.S. Pat. No. 7,343,732, issued to Hewitt on Mar. 18, 2008, discloses a combustion chamber/supersonic nozzle assembly that is cooled by an array of coolant channels in the wall of the assembly with coolant being fed to the assembly at the throat plane between the subsonic (convergent) and supersonic (divergent) sections. A minor portion of the coolant entering at the throat plane is directed to coolant channels in the supersonic section wall, while the remainder is directed to a complex arrangement of channels in the subsonic section wall. The latter arrangement includes an outer layer of wide axially oriented channels for delivery of coolant to, and removal from, an inner layer of smaller, circumferentially oriented channels that are adjacent to the hot gas and carry the bulk of the coolant load. The path of coolant travel through each inner channel is relatively short, lessening the pressure drop through those channels relative to coolant channel arrangements of the prior art.

U.S. Pat. No. 3,177,656, issued to Tick, et al. on Apr. 13, 1965, discloses cooling method and means for rocket engines wherein a compatible gas is added to the flowing coolant liquid before it passes through the jacket passages.

U.S. Patent Application Publication No. 20090293448, published to Grote and Pavia on Dec. 3, 2009, discloses, in some aspects, a propulsion system that includes a thrust chamber having a gap between an inner shell and an outer shell, the inner shell and the outer shell being attached together to form the thrust chamber. The rocket engine also includes a recirculating cooling system operably coupled to the gap in at least two locations and operable to recirculate a convective coolant through the gap.

U.S. Pat. No. 3,267,664, issued to Jones, et al. on Aug. 23, 1966, discloses method of and device for cooling. One embodiment of this invention comprises a thrust chamber in which the coolant flows in a helical path around the thrust chamber with the coolant being heated and expanded so as to pass through a nozzle portion at the exit plane of the nozzle, thus adding thrust to the vehicle. This thrust is in addition to that produced in the thrust chamber itself U.S. Patent Application Publication No. 20080134667, published to Pavia and Grote on Jun. 12, 2008, discloses, in some embodiments, a propulsion system that includes a thrust chamber having an inside wall, an expansion nozzle mounted to the thrust chamber and having an interior and having an exterior, a main propellant injector mounted to the thrust chamber to inject a fluid in the interior of the thrust chamber, the fluid comprising oxidizer, fuel and internal film coolant, the internal film coolant ranging from about 1% to about 5% of the fluid, limited coolant tubing circumscribing the exterior of the expansion nozzle to circulate an external coolant, and an injector mounted to the expansion nozzle to inject the external coolant in the interior of the expansion nozzle, the external convective coolant about 2.5% of the fluid. The system operates at lower temperatures while having conventional amounts of thrust, in which the thrust chamber can be made of thin walls of lower cost conventional metals with simple coolant tube construction.

U.S. Patent Application Publication No. 20110114069, published to Grannell, et al. on May 19, 2011, discloses various embodiments of an apparatus, system and method for operating an oxygen-enriched ammonia-fueled spark ignition engine. According to one illustrative embodiment, a method for operating an oxygen-enriched ammonia-fueled spark ignition engine includes fueling the engine with a mixture of ammonia and auxiliary oxygen within a first engine load range between zero and an engine load associated with a target combustion condition selected from the group consisting of rough limit, MBT knock limit, and any of various conditions between the rough limit and MBT knock limit. Within the first engine load range, the amounts of ammonia and auxiliary oxygen consumed per cycle increase as the load increases. The method further includes fueling the engine on a mixture of ammonia, auxiliary oxygen, and air within a second engine load range between the engine loads associated with the selected target combustion condition and the maximum engine load.

U.S. Pat. No. 4,901,525, issued to Beveridge, et al. on Feb. 20, 1990, discloses a bi-propellant self-contained propulsion system for powering rockets. A plurality of turbopump assemblies are provided to take liquid propellants from low pressure storage tanks to a substantially higher pressure thrust chamber. Substantially all of the liquid propellants are pressurized and gasified within the plurality of turbopumps. Substantially all of the gasified propellants are then used to drive the turbopumps that pressurize the liquid propellants. Gasification preferably occurs within a preburner internal to the turbopump assembly that combines a small portion of one of the propellants with a substantial portion of the other. The proportions are selected so that gasification of all of the propellants is ensured yet relatively low preburner temperatures are maintained. A multi-stage pintle assembly may be provided to vary the exit-to-throat area ratio of the nozzle. The total thrust and the mixture ratio may be controlled by shutting down some of the turbopumps. Actuation of the pintle is preferably coordinated with the shutting down of turbopumps to maintain a relatively constant thrust chamber pressure. A nozzle skirt insert is provided to enhance the low altitude performance of the rocket engine and the high altitude performance of the rocket engine.

U.S. Pat. No. 6,619,031, issued to Balepin on Sep. 16, 2003, discloses a multi-mode multi-propellant rocket engine capable of operating in a plurality of selected modes. Propellant components may include liquid hydrogen, liquid hydrocarbon, liquid oxygen, liquid fluorine, and liquid air. The liquid oxygen and the liquid air are stored in separate tanks are mixed in a dedicated mixer prior to their injection into the combustion chamber.

U.S. Pat. No. 3,768,254, issued to Stuart on Oct. 30, 1973, discloses a rocket comprising, in combination, a housing having an open inlet end portion and an outlet end portion, engine means mounted in said housing and having burner nozzles in a combustion chamber therein and an exhaust portion at said outlet end portion of said housing operable to discharge gases from said combustion chamber therethrough, a liquid hydrogen fuel storage tank positioned within said housing, a liquid air storage tank positioned within said housing, a heat exchanger mounted at said inlet portion of said housing and having an air inlet diffuser portion opening into a relatively narrow air desuperheater portion which in turn opens into an enlarged condenser portion, a plurality of tubes in said condenser portion and said air desuperheater portion of said heat exchanger, inlet headers with the inlet end of said tubes and outlet headers with the outlet end of said tubes, conduit means connected to said hydrogen fuel storage tank and connected to said inlet headers to pass liquid hydrogen fuel therethrough, control means with said last-named conduit means having pressure and temperature pickup means in said air desuperheater portion and said condenser portion of said heat exchanger to regulate flow of said fuel thereto to control pressure and temperature conditions in said air desuperheater portion and said condenser portion of said heater exchanger, conduit means positioned to receive fuel from said outlet headers of said air desuperheater portion and supply said fuel to said burner nozzles in said rocket engine, hydrogen fuel recirculating conduit means connecting said outlet headers of said tubes with the inlet of said hydrogen fuel storage tank, air condensate well means with said condenser portion of said heat exchanger, conduit means connecting said air condensate well with said liquid air storage tank and with said burner nozzles of said rocket engine, means with said liquid air storage tank to separate oxygen from the liquid air and make the same available to said burner nozzles to support combustion of the fuel, conduit means connecting said liquid air storage tank with said last-named means to provide liquid air from said liquid air storage tank thereto, and means in said rocket constructed and adapted to be initially fueled with liquid hydrogen and in flight to receive air from the atmosphere and condense same and separate the nitrogen therefrom to be used as the oxidizer for said hydrogen fuel for burning in said combustion chamber of said rocket engine.

U.S. Patent Application Publication No. 20100251695, published to Summers on Oct. 7, 2010, discloses a rocket engine for manned or unmanned space flight and atmospheric flight that uses an elongated fuel structure that is external to the combustion chamber and that is fed into the combustion chamber during operation of the rocket. The elongated fuel structure includes propellant elements and may include coolant elements as well. The elongated fuel structure of one embodiment is a ribbon and a wide ribbon may be formed of plural side-by-side ribbon sections. The wide ribbon is cut into separate ribbon sections and is fed between two opposed pinion gears of a fuel injector. The fuel injector has multiple pairs of opposed pinion gears forming multiple stages of the injector, which seal the engine from escaping gases while permitting the elongated fuel structure to be drawn into the engine. The injector has a cutting wheel at the outlet to cut open the coolant and propellant bodies in the ribbon. The propellant ribbon has an outer slow burning layer and an inner fast burning layer. Gas pressure generated by burning the propellant in the combustion chamber of the rocket engine drives the engine. The coolant to the engine is provided from the coolant elements.

U.S. Pat. No. 5,025,623, issued to Hirakoso et al. on Jun. 25, 1991, discloses known air intake type rocket engines of the type in which air is condensed and liquefied by employing a propelling agent, loaded on the rocket, as a coolant, and in which the liquefied air is utilized as an oxidizing agent or working fluid, are improved according to the present invention in that air remaining uncondensed is compressed and then condensed and liquefied by employing the liquefied air as a coolant.

U.S. Pat. No. 6,808,145, issued to Burton on Oct. 26, 2004, discloses a method for a dual-mode propulsion system. During the first mode of operation, intake air is liquefied through a cooling heat exchanger and condenser using a combination of stored liquid hydrogen (LH2) and stored liquid nitrogen (LN2) as coolants. The liquefied air is then separated into separated liquid oxygen (SLO2) and separated liquid nitrogen (SLN2), which may contain molecules of each other or other elements commonly found in air. The stored liquid nitrogen is replaced with SLO2, while the SLN2 is pumped back through the system with the stored nitrogen in a regeneration process. The SLN2, LN2, and LH2 become gaseous as they pass through the condenser and heat exchanger and are burned in the dual mode rocket thrust chamber to produce thrust. In the second mode, the same thrust chamber is operated as a liquid hydrogen-oxygen rocket, where the liquid oxygen is the SLO2 collected during the first mode.

U.S. Patent Application Publication No. 20050198958, published to Haase on Sep. 15, 2005, discloses improved combustion methods, systems, engines and apparatus utilizing H2, O2 and H2O as fuel, thereby providing environmentally friendly combustion products, as well as improved fuel and energy management methods, systems, engines and apparatus. The Water Combustion Technology; WCT, is based upon water (H2O) chemistry, more specifically H2O combustion chemistry and thermodynamics. WCT does not use any hydrocarbon fuel source, rather the WCT uses H2 preferably with O2 and secondarily with air. The WCT significantly improves the thermodynamics of combustion, thereby significantly improving the efficiency of combustion, utilizing the first and second laws of thermodynamics. The WCT preferably controls combustion temperature with H2O and secondarily with air in the combustion chamber. The WCT preferably recycles exhaust gas energy as fuel converted from water. The WCT minimizes external cooling loops and minimizes exhaust and/or exhaust energy, thereby maximizing available work and internal energy while minimizing enthalpy and entropy losses.

The Applicant is unaware of inventions or patents, taken either singly or in combination, which are seen to describe the instant invention as claimed.

SUMMARY OF THE INVENTION

The present invention relates to improved rocket engine systems with an independently regulated cooling system.

An improved rocket engine system with an independently regulated cooling system includes a rocket engine, a coolant source, and a propellant source. Each of the coolant source and propellant source is in operative communication with the rocket engine whereby there is independent regulation or control of coolant source flow relative to propellant source flow. The improved rocket engine may further include one or more of the following: at least one power source, at least one power source motor, at least one pump, at least one controller, and a propellant pressurizing source.

The propellant source preferably includes a fuel source and an oxidizer source.

A first embodiment of the improved rocket engine system includes a cooling system with a coolant source, a fuel system with a fuel source, an oxidizer system with an oxidizer source, a propellant pressurizing system with a propellant pressurizing source, a plurality of electric pumps (such as three electric pumps), an assembly with a power source and a controller, and a main rocket engine assembly with a combustion chamber, injector and nozzle.

The cooling system preferably includes a coolant source, a pressure regulator, a check valve, an isolation valve, a vent valve, a coolant tank, a drain/fill valve and coupling, a feed valve, an electric pump, and a feed line.

The fuel system preferably includes a fuel source, a pressure regulator, a check valve, an isolation valve, a vent valve, a fuel tank, a drain/fill valve and coupling, a feed valve, an electric pump, and a feed line.

The oxidizer system preferably includes an oxidizer source, a pressure regulator, a check valve, an isolation valve, a vent valve, an oxidizer tank, a drain/fill valve and coupling, a feed valve, an electric pump, and a feed line.

The propellant pressurizing system preferably includes a propellant pressurizing source, a propellant pressurizing tank, a vent/fill valve and coupling, a relief valve, and a valve.

The assembly with a power source and a controller includes a power source and a controller.

The main rocket engine assembly includes throttle valves, a combustion chamber, a coolant feed line, a nozzle, and an injector.

A second embodiment of the improved rocket engine system includes a cooling system with a coolant source, a fuel system with a fuel source, an oxidizer system with an oxidizer source, a propellant pressurizing system with a propellant pressurizing source, a plurality of electric pumps (such as three electric pumps), an assembly with a power source and a controller, a main rocket engine assembly as described above, and a gas generator plus turbine assembly.

The gas generator plus turbine assembly includes throttle valves, a gas generator, a turbine, and a gas generator exhaust. The gas generator plus turbine assembly is preferably connected to or in operative communication with the fuel system and oxidizer system, and also preferably located between, connected to or in operative communication with electric pumps. The turbine is located between, connected to or in operative communication with electric pumps, connected to or in operative communication with the gas generator, and connected to or in operative communication with the gas generator exhaust.

A third embodiment of the improved rocket engine system includes a cooling system with a coolant source, a fuel system with a fuel source, an oxidizer system with an oxidizer source, a propellant pressurizing system with a propellant pressurizing source, a plurality of electric pumps (such as two electric pumps) where the cooling system does not include an electric pump nor an assembly with a power source and a controller.

It should be understood that the above-attached figures are not intended to limit the scope of the present invention in any way.

DETAILED DESCRIPTION OF THE PREFERRED EMBODIMENTS

Referring to FIGS. 1-10, the present invention is an improved rocket engine system 100, 300, 500, 700 with an independently regulated cooling system that includes a rocket engine, a coolant source, and a propellant source. Each of the coolant source and propellant source is in operative communication with the rocket engine whereby there is independent regulation or control of coolant source flow relative to propellant source flow.

The improved rocket engine system 100, 300, 500, 700 may further include one or more of the following: at least one power source, at least one power source motor (electric or mechanical prime mover), at least one pump, at least one controller, and a propellant pressurizing source.

The propellant source preferably includes a fuel source and an oxidizer source. The propellant source may also include any other propellant that is known to one of ordinary skill in the art.

Figure 1:
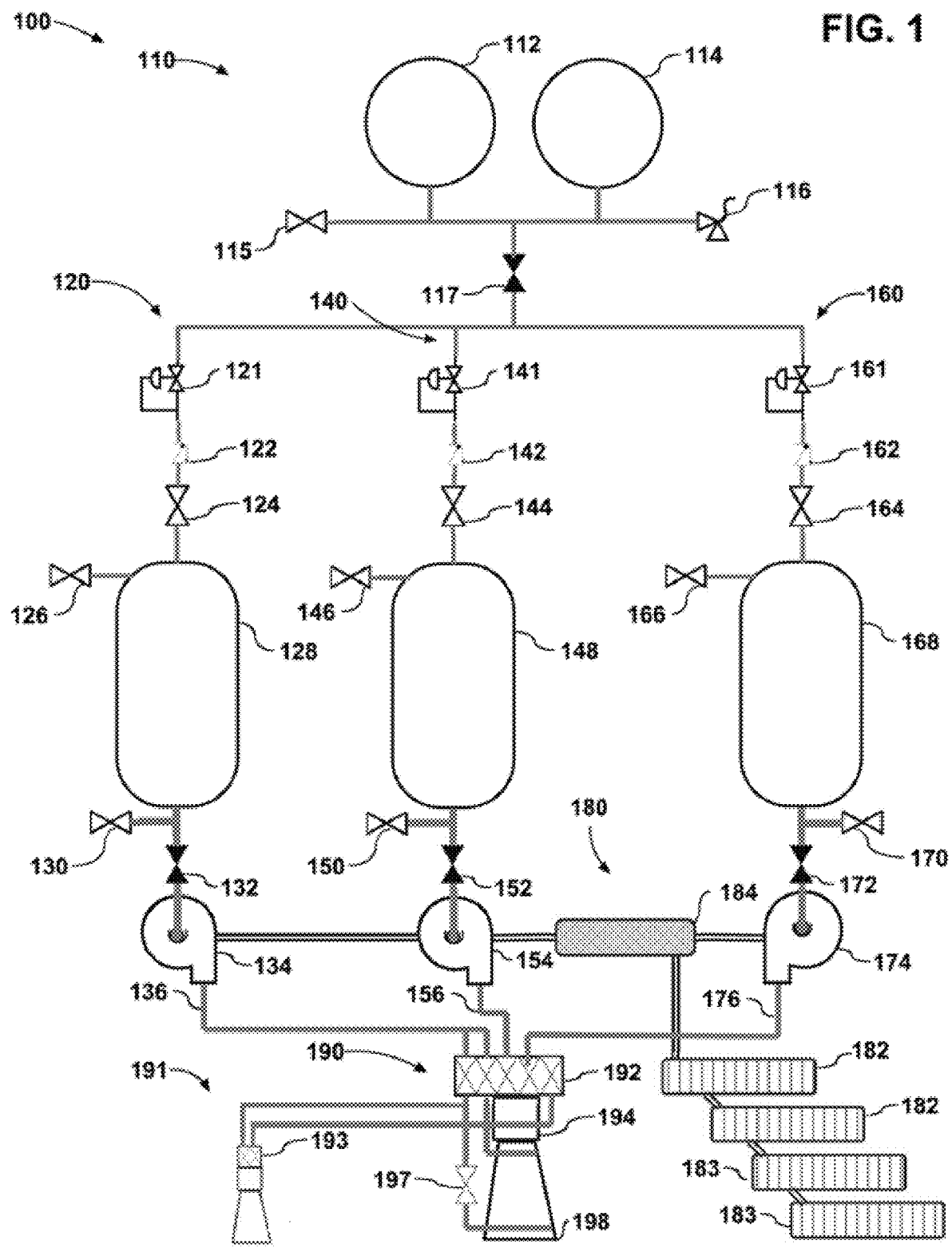
FIG. 1 is a detailed, schematic view of a first embodiment of an improved rocket engine system with an independently regulated cooling system according to the present invention, showing a an oxidizer tank, a fuel tank, a coolant tank, three electric pumps, a controller, and a power source, and also showing coolant routed to a Vernier thruster used for altitude control or ullage maneuvers.
Figure 2:
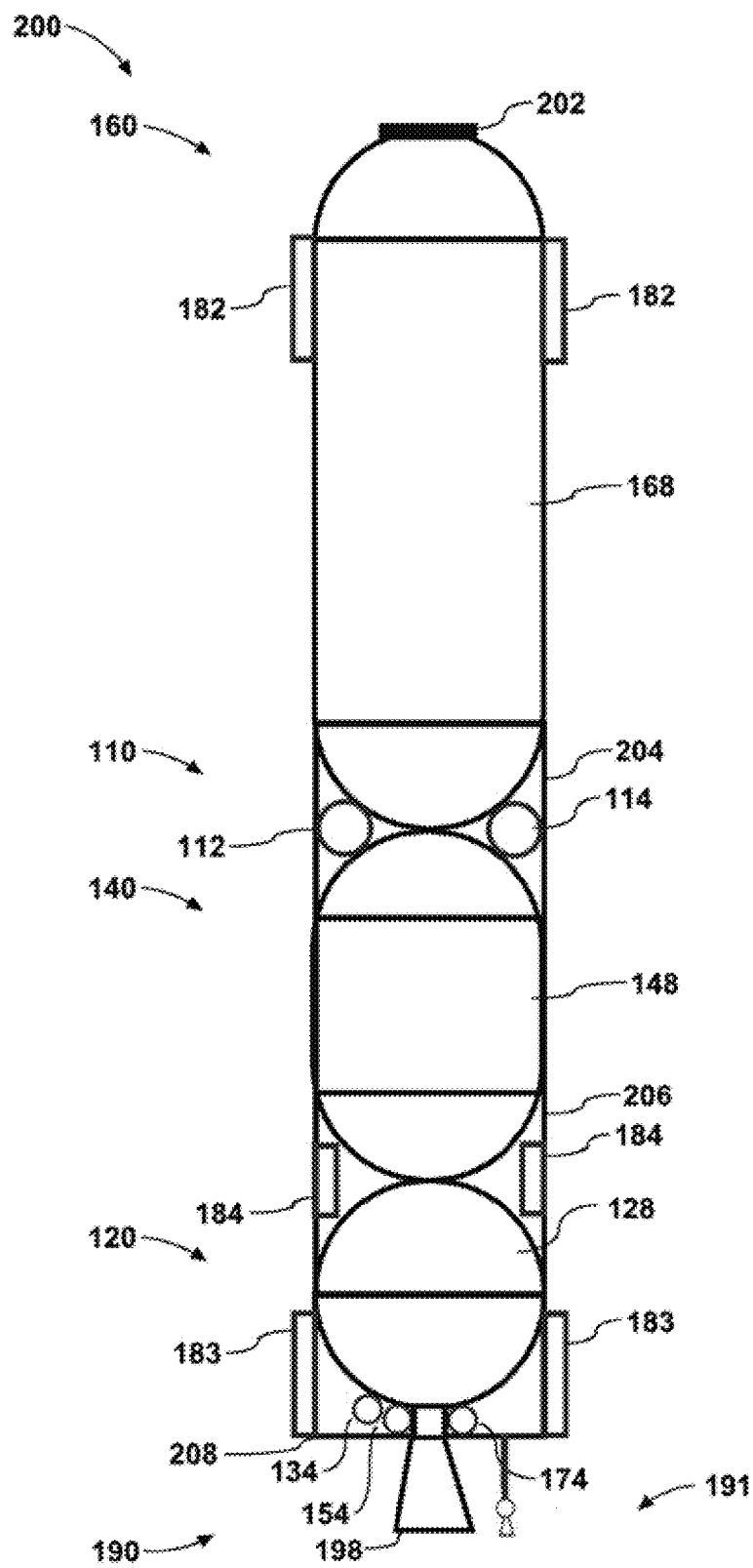
FIG. 2 is a schematic, cut-away view of the improved rocket engine system of FIG. 1, showing an example of an arrangement of the oxidizer tank, fuel tank, coolant tank, three electric pumps, controller, and power source in a rocket stage.

Referring to FIGS. 1 and 2, a first embodiment of the improved rocket engine system 100 includes a cooling system 120 with a coolant source, a fuel system 140 with a fuel source, an oxidizer system 160 with an oxidizer source, a propellant pressurizing system 110 with a propellant pressurizing source, a plurality of pumps, preferably three electric pumps, 134, 154, 174, an assembly 180 with a power source and a controller, and a main rocket engine assembly 190.

FIG. 1 shows a detailed, schematic view of the first embodiment of an improved rocket engine system with an independently regulated cooling system according to the present invention, showing a an oxidizer tank 168, a fuel tank 148, a coolant tank 128, three electric pumps 134, 154, 174, a controller 184, and a power source 182, 183, and also showing coolant 193 routed to a Vernier thruster 191 used for altitude control or ullage maneuvers.

FIG. 2 shows a schematic, cut-away view of the first embodiment, and, in addition to showing other devices, parts or elements described below, shows a payload adaptor 202, a first interstage 204, a second interstage 206, and an aft skirt 208. Preferably, the payload adaptor 202, first interstage 204, second interstage 206, and aft skirt 208 respectively are devices that are known to one of ordinary skill in the art. The batteries 182, 183 may be jettisoned at convenient moments to adjust weight and balance of the stage.

As best shown in FIG. 1, the cooling system 120 preferably includes a coolant source, a pressure regulator 121, a check valve 122, an isolation valve 124, a vent valve 126, a coolant tank 128, a drain/fill valve and coupling 130, a feed valve 132, an electric pump 134, and a feed line 136.

The coolant source is preferably contained within the coolant tank 128, and is preferably a consumable coolant. The consumable coolant increases engine performance and engine life, and improves throttling performance. The consumable coolant is selected based upon thermal requirements, and can reduce engine technology challenges while allowing better performance. Specifically, cooling using a common propellant requires additional fluid pressure and volume resulting in turbomachinery at twice the needed pressures for propulsion chemistry. By creating an independent or third path, relative to the first and second paths for fuel source flow and oxidizer source flow, for coolant flow and selecting an optimal coolant fluid, such as water/ammonia, hydrazine, liquid hydrogen, anhydrous ammonia, or alcohol, turbine workloads are dramatically reduced with minimal impact to performance. Throttling is particularly enhanced by this consumable coolant flow path. In-flight restart is significantly enhanced due to the separate coolant flow. In-flight restart also implies the ability to change propellants during flight allowing a multi-fuel stage using the same engines. An example would be the use of liquid hydrogen as a consumable coolant while propane is burned with oxygen as the main propellants: when the propane is exhausted, the engine valves adjust in an increased flow of liquid hydrogen as both a coolant and into the injector as a main propellant. Another example would be using anhydrous ammonia as a consumable coolant while the main injector flows propane and liquid oxygen (LOX). At a preferred time, the propane flow can be stopped and liquid hydrogen valved in.

Throttling normally requires increased flow percentages through the coolant jacket while the primary injector path decreases in pressure and volume. This requires extremely heavy, unreliable and complex fluid proportioning valves. By creating a simple third path, that path can be regulated and controlled for cooling needs while the main injector is throttled.

Preferably, the pressure regulator 121, check valve 122, isolation valve 124, vent valve 126, coolant tank 128, drain/fill valve and coupling 130, feed valve 132, electric pump 134, and feed line 136 respectively are devices that are known to one of ordinary skill in the art.

The fuel system 140 preferably includes a fuel source, a pressure regulator 141, a check valve 142, an isolation valve 144, a vent valve 146, a fuel tank 148, a drain/fill valve and coupling 150, a feed valve 152, an electric pump 154, and a feed line 156.

The fuel source is preferably contained within the fuel tank 148, and, as a non-limiting example, may be a mono-propellant fuel. The fuel source may be a liquid fuel, a gelled fuel, a solid fuel, a gaseous fuel, a fluid fuel, a thixotropic or pseudoplastic material, and any combination thereof. The fuel source may also be any other type of fuel that is known to one of ordinary skill in the art. Preferably, the fuel source is a liquid fuel, such as, but not limited to, monomethyl hydrazine (MMH), kerosene, methane, propane, ammonia, and pentaborane. This is because a solid fuel, such as, but not limited to, butadyne mixed with aluminum and perchlorate, is more difficult to throttle. Also, the fuel source may be a liquid mono-propellant fuel, a liquid bi-propellant fuel, a solid-liquid hybrid propellant fuel, or any combination thereof.

Preferably, the pressure regulator 141, check valve 142, isolation valve 144, vent valve 146, fuel tank 148, drain/fill valve and coupling 150, feed valve 152, electric pump 154, and feed line 156 respectively are devices that are known to one of ordinary skill in the art, and are exactly the same, or substantially similar to, and provide substantially the same performance as the corresponding pressure regulator 121, check valve 122, isolation valve 124, vent valve 126, drain/fill valve and coupling 130, feed valve 132, electric pump 134, and feed line 136.

The oxidizer system 160 preferably includes an oxidizer source, a pressure regulator 161, a check valve 162, an isolation valve 164, a vent valve 166, an oxidizer tank 168, a drain/fill valve and coupling 170, a feed valve 172, an electric pump 174, and a feed line 176.

The oxidizer source is preferably contained within the oxidizer tank 168, and, as a non-limiting example, may be a mono-propellant oxidizer, such as hydrogen peroxide. The oxidizer source may be a liquid oxidizer, a solid oxidizer, a gaseous oxidizer, and any combination thereof. The oxidizer source may also be any other type of oxidizer that is known to one of ordinary skill in the art. Preferably, the oxidizer source is a liquid oxidizer, such as, but not limited to, nitrogen tetroxide (NTO), hydrogen peroxide, liquid oxygen, nitrous oxide, and nitric acid. Also, the oxidizer source may be a liquid mono-propellant oxidizer, a liquid bi-propellant oxidizer, a solid-liquid hybrid propellant oxidizer, or any combination thereof. As a non-limiting example, when a space vehicle relating to this embodiment uses a liquid fuel or a combination or hybrid liquid-solid fuel, the space vehicle will preferably also use a liquid oxidizer or a combination or hybrid liquid-gas oxidizer, respectively. It is also possible to have an additional fuel source of a different character to be mixed in, or switched between during operations.

Preferably, the pressure regulator 161, check valve 162, isolation valve 164, vent valve 166, oxidizer tank 168, drain/fill valve and coupling 170, feed valve 172, electric pump 174, and feed line 176 respectively are devices that are known to one of ordinary skill in the art, and are exactly the same, or substantially similar to, and provide substantially the same performance as the corresponding pressure regulator 121, 141, check valve 122, 142, isolation valve 124, 144, vent valve 126, 146, drain/fill valve and coupling 130, 150, feed valve 132, 152, electric pump 134, 154, and feed line 136, 156.

The propellant pressurizing system 110 preferably includes a propellant pressurizing source, a pair of propellant pressurizing tanks 112, 114, a vent/fill valve and coupling 115, a relief valve 116, and a valve 117.

The propellant pressurizing source is preferably contained within the propellant pressurizing tanks 112, 114. The pressurizing source pressurizes the coolant tank 128, fuel tank 148, and oxidizer tank 168, via valve 117. Preferably, the pressurizing source is a non-reactive gas, such as, but not limited to, helium, argon, neon, and nitrogen.

The assembly 180 with a power source and a controller includes a power source 182, 183 and a controller 184.

Preferably, the power source 182, 183 is an electric power source, and at least one electric power source performs at less than 1,000 kw. As non-limiting examples, each electric power source may be or include a battery 182, a fuel cell, a solar cell, a capacitor source, a diode, a transistor, other current control devices, a generator, such as, but not limited to, a mechanical generator and a turbo generator, or any combination thereof. Preferably, each electric power source may be or include multiple batteries 182, 183 that are individually separated, or provided in separate modules, such that each battery can be releasably jettisoned individually from the improved rocket engine system at different times during a flight when a predetermined altitude is reached. The discarding of the power source, possibly also the controller and electric motor, during a flight helps, or may help, to reduce weight and save fuel and costs, to improve performance of the engine system, and to improve the mass ratio or adjust vehicle center of gravity. The multiple batteries may be connected by battery connectors (or passive conductors or active circuits including diodes, transistors, thyristors, DC-DC convertors, transformers) or any other type of connector that is known to one of ordinary skill in the art. It is obvious to one of ordinary skill in the art that the power source may be a non-electric variety. The above can be improved by adding a blocking diode to each of the modules that are jettisoned and by making the modules of slightly different voltage. They can be either all brought on line simultaneously or jettisoned with reduced current through the ejection fixture. Also, the above can be improved by connecting a spacecraft electrical bus into the motor propulsion bus to provide additional energy. The above batteries can be fed to electromechanical or electro hydraulic actuators, and provide power for the steering actuators.

The controller 184 preferably regulates voltage, current, phase, overcurrent protection, and speed control. The controller 184 is preferably connected to or in communication with the multiple batteries 182, 183, and also preferably located between, connected to or in communication with electric pumps 154, 174.

Preferably, the power source motor (not shown; as an examplary power source motor, it is buried in a pump) is an electric motor. Each electric power source motor is in operative communication with, preferably connected to, a corresponding electric power source. As non-limiting examples, each electric power source motor may be an AC motor (such as, but not limited to, a three-phase motor), a DC motor, a motor mechanically connected to another motor, or any combination thereof. It is obvious to one of ordinary skill in the art that the power source motor (prime mover) may be a non-electric variety.

The main rocket engine, or rocket engine assembly, 190 preferably includes throttle valves 192, a combustion chamber 194, a coolant feed line 196, a nozzle 198, and an injector (not shown).

Preferably, the nozzle 198 is a Lobed nozzle, which preferably means a standard nozzle that can be used on any engine regardless of trajectory. Instead of designing ideal nozzles and needing to manufacture them specifically for the design trajectory starting point, a standard Lobed nozzle can be used on any mission, resulting in lower costs and improving trajectory averaged specific impulse (Isp).

As non-limiting examples, the rocket engine 190 may be a liquid mono-propellant rocket engine, a liquid bi-propellant rocket engine, or a hybrid solid-liquid propellant rocket engine.

Each pump 134, 154, 174 is in operative communication with, preferably connected to, a corresponding electric power source motor. Also, each pump 134, 154, 174 is in operative communication with, preferably connected to, the rocket engine. Further, each pump 134, 154, 174 is in operative communication with the propellant source whereby the pump 134, 154, 174 is able to supply the propellant source to the rocket engine. Preferably, the pumps 134, 154, 174 are connected, mechanically or electrically, to one another. As an alternative to a pump and a corresponding electric power source motor, it is obvious to one of ordinary skill in the art that a glandless pump or the like can be used in their place. As non-limiting examples, each pump 134, 154, 174 may a turbo pump, a mechanical displacement pump, a diaphragm pump, or any combination thereof.

Preferably, the rocket engine 190 is a throttleable engine that is able to throttle to a reduced power setting during flight. As an example, the reduced power setting is within a range from about 1% to about 50% power of a normal power setting. As another example, the reduced power setting is within a range from about 1% to about 30% power of a normal power setting. As an additional example, the reduced power setting is within a range from about 1% to about 11% power of a normal power setting. Preferably, the throttleable engine is able to throttle and is operated at a reduced power setting during powered flight. As non-limiting examples, the throttleable engine may include one nozzle and one chamber, or a plurality of nozzles and one chamber.

As one non-limiting example, the throttleable engine is comprised of a chamber supplied with a propellant combination with active or passive cooling in the chamber and nozzle. Active cooling may be accomplished by film cooled, duct cooled, regeneratively cooled, or transpiration cooled, and passive cooling may be accomplished by either an ablative material or a high temperature radiative material. The chamber has either an adjustable pintle injector with face shut off or internal valves, a showerhead injector with variable port geometry, or a rigid screen mesh through which propellant is introduced and dispersed in the chamber. The throttleable engine has a throat of sufficient size to constrict the combustion products and force flow of about mach one speed at the nozzle's narrowest part and force flow above supersonic speed in the diverging nozzle.

The pintle injector may be described as a pipe within a pipe where two separate propellants may be supplied and caused to mix at the end point at an extreme convergence angle. Preferably, the pintle injector is a dual sleeve pintle injector, which allows any propellant combination to be used as primary oxidizer or fuel. The dual sleeve pintle injector allows mixture ratios to be adjusted to the needs of the specific propellant combinations. That allows the same engine to run on propellants as diverse as hydrazine/tetroxide, hydrocarbon/LOX, or even hydrogen and peroxide, including simultaneously or sequentially.

The showerhead injector may be described as a plate with many ports, or holes drilled in it, where the ports are supplied with propellants which mix after exiting the ports. The rigid screen mesh injector may be described as layers of a perforated material placed in layers with propellants introduced from one side and then the propellants disperse and mix while travelling through the mesh.

As another non-limiting example, the throttleable engine is a 60, 000 lbf pressure fed, deep throttling, fully reusable, NTO-MMH pintle engine with 2.25 factor of safety. The throttleable engine may use NTO for an oxidizer, MMH as a fuel, and helium to pressurize the propellant tanks. The throttleable engine may use a combination of ablator and film cooling to reduce costs and reduce risk. The throttleable engine can throttle from 10% to 100% of full thrust while maintaining stable combustion.

Further, the throttleable engine may be secured or attached to a stage (not shown) by any method known to one of ordinary skill in the art. The stage may be any set of tanks, pipes, connecting skirts and stage adapters or payload adapters known to one of ordinary skill in the art.

Figure 3:
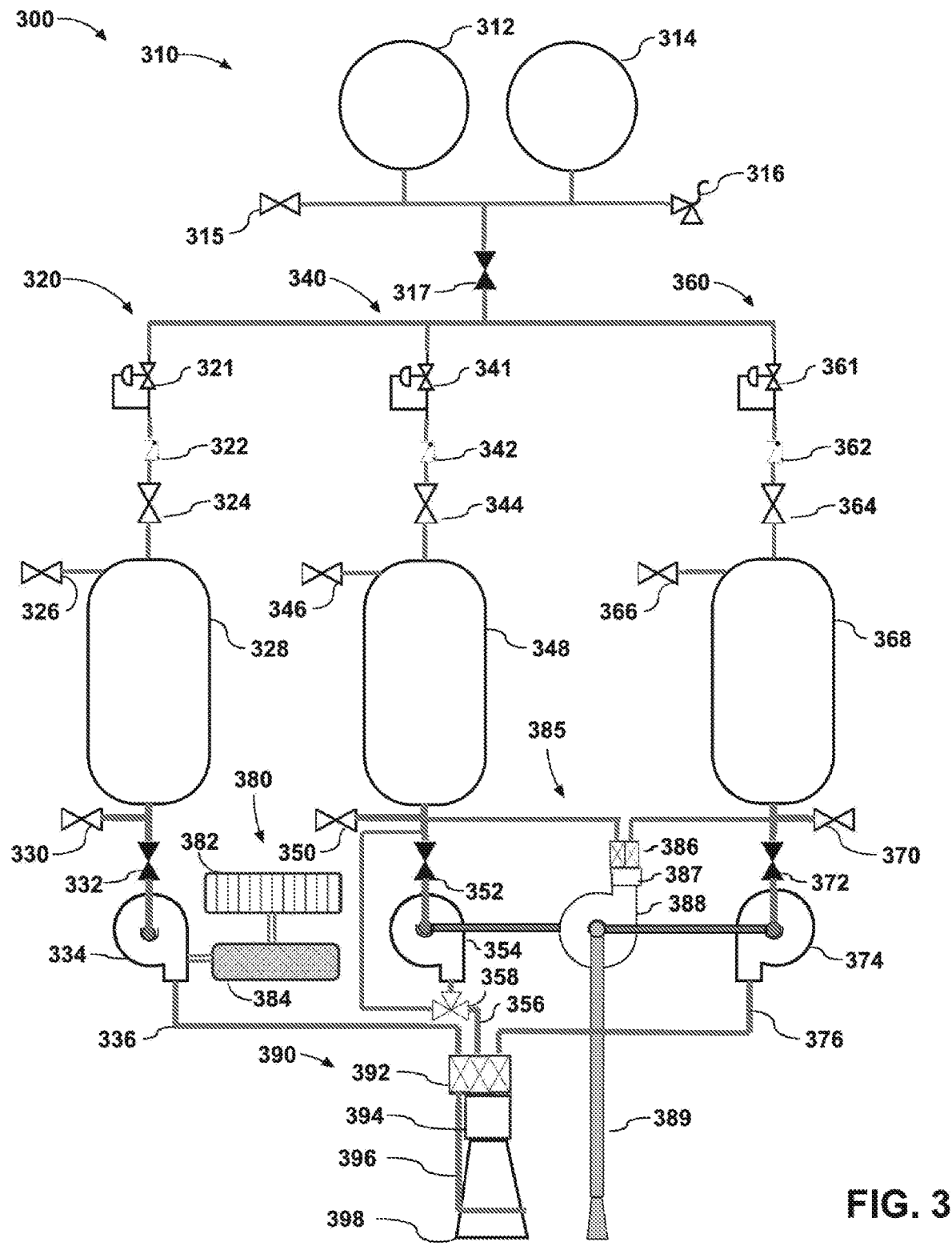
FIG. 3 is a detailed, schematic view of a second embodiment of an improved rocket engine system with an independently regulated cooling system according to the present invention, showing an oxidizer tank, a fuel tank, a coolant tank, one electric pump, two mechanical pumps, a controller, a power source, and a gas generator plus turbine assembly.
Figure 4:
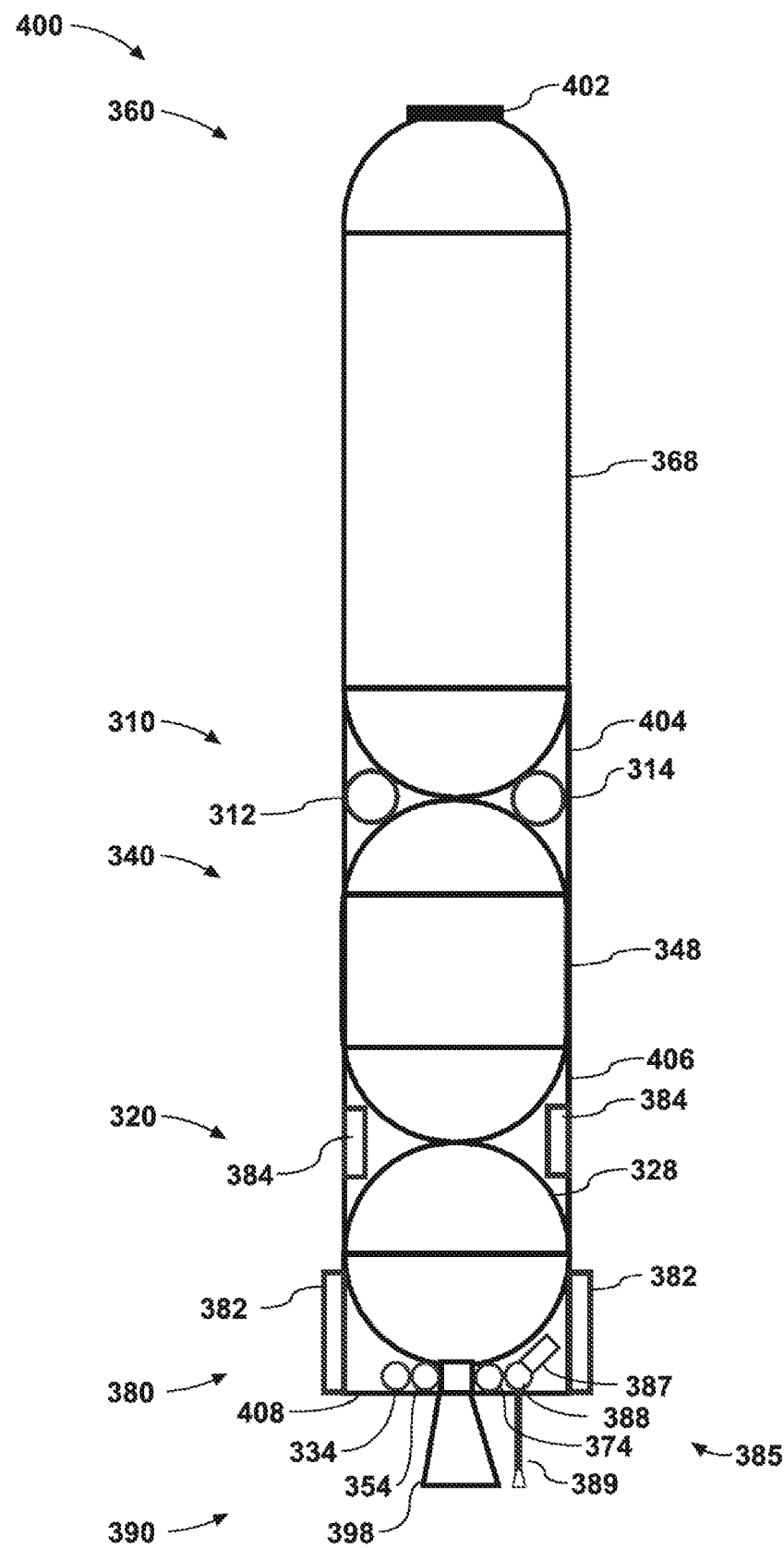
FIG. 4 is a schematic, cut-away view of the improved rocket engine system of FIG. 3, showing an example of an arrangement of the oxidizer tank, fuel tank, coolant tank, one electric pump, two mechanical pumps, controller, power source, and gas generator plus turbine assembly in a rocket stage.

Referring to FIGS. 3 and 4, a second embodiment of the improved rocket engine system 300 includes a cooling system 320 with a coolant source, a fuel system 340 with a fuel source, an oxidizer system 360 with an oxidizer source, a propellant pressurizing system 310 with a propellant pressurizing source, a plurality of pumps, preferably one electric pump motor 334 and two mechanical pumps 354, 374, an assembly 380 with a power source and a controller, a main rocket engine assembly 390, and a gas generator plus turbine assembly 385.

FIG. 3 shows a detailed, schematic view of the second embodiment, a two main propellant system with a gas generator engine pump for fuel and oxidizer and a coolant flow pressurized by an electrical motor pump and batteries. Here, it's one electric pump and one gas generator where the gas generator plus turbine assembly is driving two mechanical pumps. Naturally you could do two electric pumps and one mechanical turbine off the gas generator too, but it gets real ungainly to describe every permutation of pressure feed, gas generator and electrical pump.

FIG. 4 shows a schematic, cut-away view of the second embodiment, and, in addition to showing other devices, parts or elements described below, shows a payload adaptor 402, a first interstage 404, a second interstage 406, and an aft skirt 408. Preferably, the payload adaptor 402, first interstage 404, second interstage 406, and aft skirt 408, respectively, are devices that are known to one of ordinary skill in the art, and are exactly the same, or substantially similar to, and provide substantially the same performance as the corresponding payload adaptor 202, first interstage 204, second interstage 206, and aft skirt 208 of the first embodiment. The batteries 382 may be jettisoned at convenient moments to adjust weight and balance of the system when integrated in a stage 400, such as in FIG. 4.

As best shown in FIG. 3, the cooling system 320 preferably includes a coolant source, a pressure regulator 321, a check valve 322, an isolation valve 324, a vent valve 326, a coolant tank 328, a drain/fill valve and coupling 330, a feed valve 332, an electric pump 334, and a feed line 336.

Preferably, the coolant source is exactly the same, or substantially similar to, the coolant source of the first embodiment. The coolant source is preferably contained within the coolant tank 328, and is preferably a consumable coolant.

Preferably, the pressure regulator 321, check valve 322, isolation valve 324, vent valve 326, coolant tank 328, drain/fill valve and coupling 330, feed valve 332, electric pump 334, and feed line 336 respectively are devices that are known to one of ordinary skill in the art, and are exactly the same, or substantially similar to, and provide substantially the same performance as the corresponding pressure regulator 121, 141, 161, check valve 122, 142, 162, isolation valve 124, 144, 164, vent valve 126, 146, 166, coolant tank 128, drain/fill valve and coupling 130, 150, 170, feed valve 132, 152, 172, electric pump 134, 154, 174, and feed line 136, 156, 176 of the first embodiment.

The fuel system 340 preferably includes a fuel source, a pressure regulator 341, a check valve 342, an isolation valve 344, a vent valve 346, a fuel tank 348, a drain/fill valve and coupling 350, a feed valve 352, a mechanical pump 354, a three-way diverter valve 358 to allow supplemental feed and prevent an oxidizer rich shutdown, and a feed line 356.

Preferably, the fuel source is exactly the same, or substantially similar to, the fuel source of the first embodiment. The fuel source is preferably contained within the fuel tank 348, and preferably is a liquid fuel.

Preferably, the pressure regulator 341, check valve 342, isolation valve 344, vent valve 346, fuel tank 348, drain/fill valve and coupling 350, feed valve 352, and feed line 356 respectively are devices that are known to one of ordinary skill in the art, and are exactly the same, or substantially similar to, and provide substantially the same performance as the corresponding pressure regulator 121, 141, 161, 321, check valve 122, 142, 162, 322, isolation valve 124, 144, 164, 324, vent valve 126, 146, 166, 326, fuel tank 148, drain/fill valve and coupling 130, 150, 170, 330, feed valve 132, 152, 172, 332, and feed line 136, 156, 176, 336 of the first and current embodiments. Preferably, the mechanical pump 354 and three-way diverter valve 358 are devices that are known to one of ordinary skill in the art.

The oxidizer system 360 preferably includes an oxidizer source, a pressure regulator 361, a check valve 362, an isolation valve 364, a vent valve 366, an oxidizer tank 368, a drain/fill valve and coupling 370, a feed valve 372, a mechanical pump 374, and a feed line 376.

Preferably, the oxidizer source is exactly the same, or substantially similar to, the oxidizer source of the first embodiment. The oxidizer source is preferably contained within the oxidizer tank 368, and is preferably a liquid oxidizer.

Preferably, the pressure regulator 361, check valve 362, isolation valve 364, vent valve 366, oxidizer tank 368, drain/fill valve and coupling 370, feed valve 372, mechanical pump 374, and feed line 376 respectively are devices that are known to one of ordinary skill in the art, and are exactly the same, or substantially similar to, and provide substantially the same performance as the corresponding pressure regulator 121, 141, 161, 321, 341, check valve 122, 142, 162, 322, 342, isolation valve 124, 144, 164, 324, 344, vent valve 126, 146, 166, 326, 346, oxidizer tank 168, drain/fill valve and coupling 130, 150, 170, 330, 350, feed valve 132, 152, 172, 332, 352, mechanical pump 354, and feed line 136, 156, 176, 336, 356 of the first and current embodiments.

The propellant pressurizing system 310 preferably includes a propellant pressurizing source, a pair of propellant pressurizing tanks 312, 314, a vent/fill valve and coupling 315, a relief valve 316, and a valve 317.

Preferably, the propellant pressurizing source is exactly the same, or substantially similar to, the propellant pressurizing source of the first embodiment. The propellant pressurizing source is preferably contained within the propellant pressurizing tanks 312, 314. The pressurizing source pressurizes the coolant tank 328, fuel tank 348, and oxidizer tank 368, via valve 317.

Preferably, the propellant pressurizing tanks 312, 314, vent/fill valve and coupling 315, relief valve 316, and valve 317 respectively are devices that are known to one of ordinary skill in the art, and are exactly the same, or substantially similar to, and provide substantially the same performance as the corresponding propellant pressurizing tank 112, 114, vent/fill valve and coupling 115, relief valve 116, and valve 117 of the first embodiment.

The assembly 380 with a power source and a controller includes a power source 382 and a controller 384.

Preferably, the power source 382 and controller 384 are devices that are known to one of ordinary skill in the art, and are exactly the same, or substantially similar to, and provide substantially the same performance as the corresponding power source 182 and controller 184 of the first embodiment. Preferably, the power source 382 is multiple batteries 382.

The controller 384 is preferably connected to or in communication with the multiple batteries 382.

The main rocket engine assembly 390 includes throttle valves 392, a combustion chamber 394, a coolant feed line 396, a nozzle 398, and an injector (not shown).

Preferably, the throttle valves 392, combustion chamber 394, coolant feed line 396, nozzle 398, and rocket engine are devices that are known to one of ordinary skill in the art, and are exactly the same, or substantially similar to, and provide substantially the same performance as the corresponding throttle valves 192, combustion chamber 194, coolant feed line 196, nozzle 198, and rocket engine of the first embodiment. Preferably, the nozzle 398 is a Lobed nozzle.

The gas generator plus turbine assembly 385 includes throttle valves 386, a gas generator 387, a turbine 388, and a gas generator exhaust 389. The gas generator plus turbine assembly 385 is preferably connected to or in communication with the fuel system 340 and oxidizer system 360, and also preferably located between, connected to or in communication with mechanical pumps 354, 374. As shown in FIG. 3, the turbine 388 is located between, connected to or in communication with mechanical pumps 354, 374, connected to or in communication with the gas generator 387, and connected to or in communication with the gas generator exhaust 389.

Preferably, the throttle valves 386, gas generator 387, turbine 388, and gas generator exhaust 389 are devices that are known to one of ordinary skill in the art.

As non-limiting examples, throttle valves can be gate valves, ball valves, venturi valves, needle valves or any other valve known in the art. The gas generator is an exothermic chemical combustor which provides high temperature, high pressure gas to the turbine. The turbine is a machine (engine) to extract mechanical work from a high energy fluid stream and provide mechanical work to another fluid stream or to another mechanical device such as a pump or electrical generator. The gas generator exhaust is a low enthalpy output from the turbine which is dumped overboard or used to assist in roll control.

Preferably, the electric pump 334 and mechanical pumps 354, 374 are devices that are known to one of ordinary skill in the art, and the electric pump 334 is exactly the same, or substantially similar to, and provide substantially the same performance as the corresponding pumps 134, 154, 174 of the first embodiment.

Preferably, the pintle injector and throttleable engine of this embodiment are exactly the same, or substantially similar to, and provide substantially the same performance as the corresponding pintle injector and throttleable engine of the first embodiment.

Figure 5:
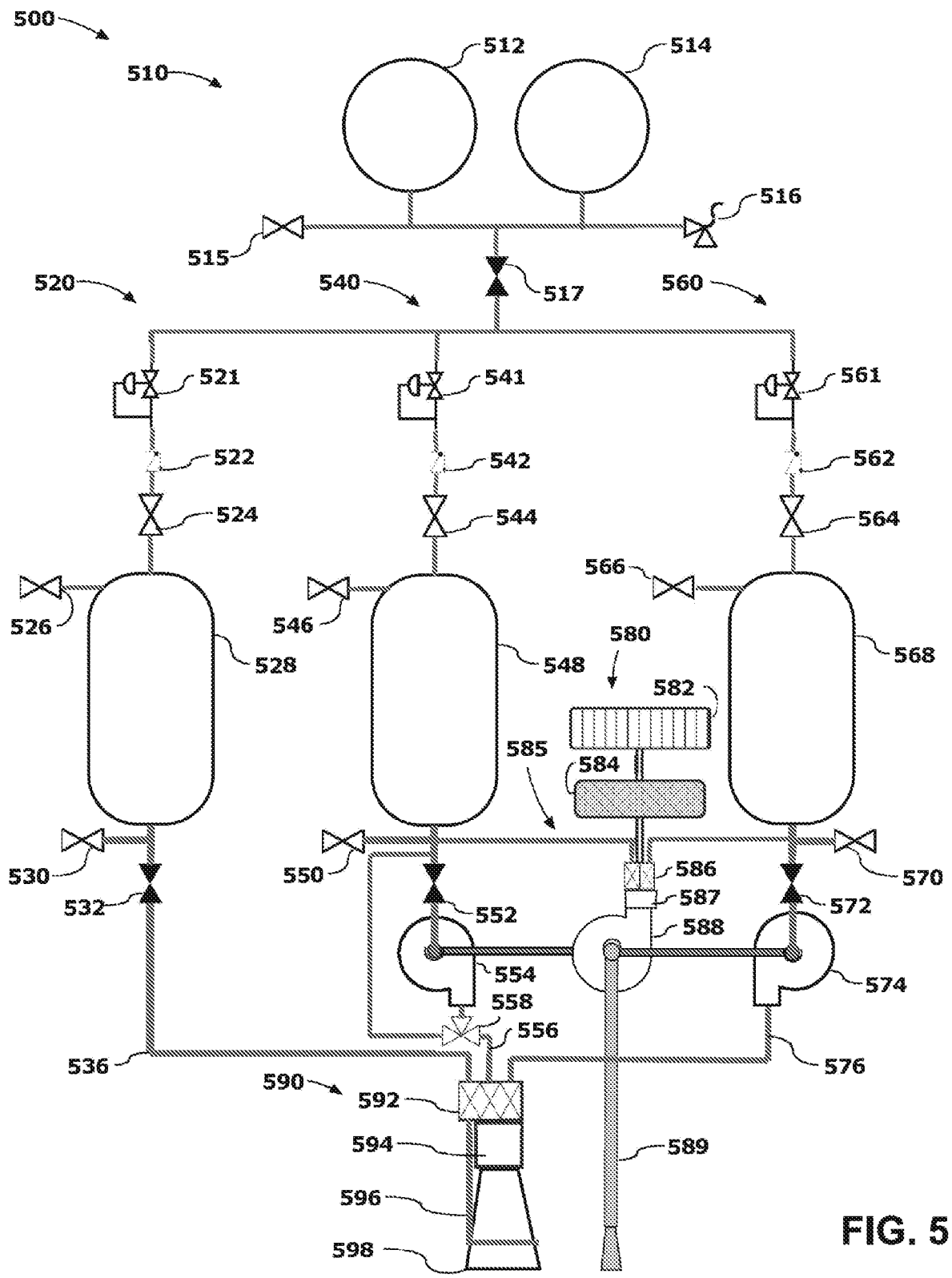
FIG. 5 is a detailed, schematic view of a third embodiment of an improved rocket engine system with an independently regulated cooling system according to the present invention, showing an oxidizer tank, a fuel tank, a coolant tank, two mechanical pumps a controller, a power source, a pressurizing source, and a gas generator plus turbine assembly.
Figure 6:
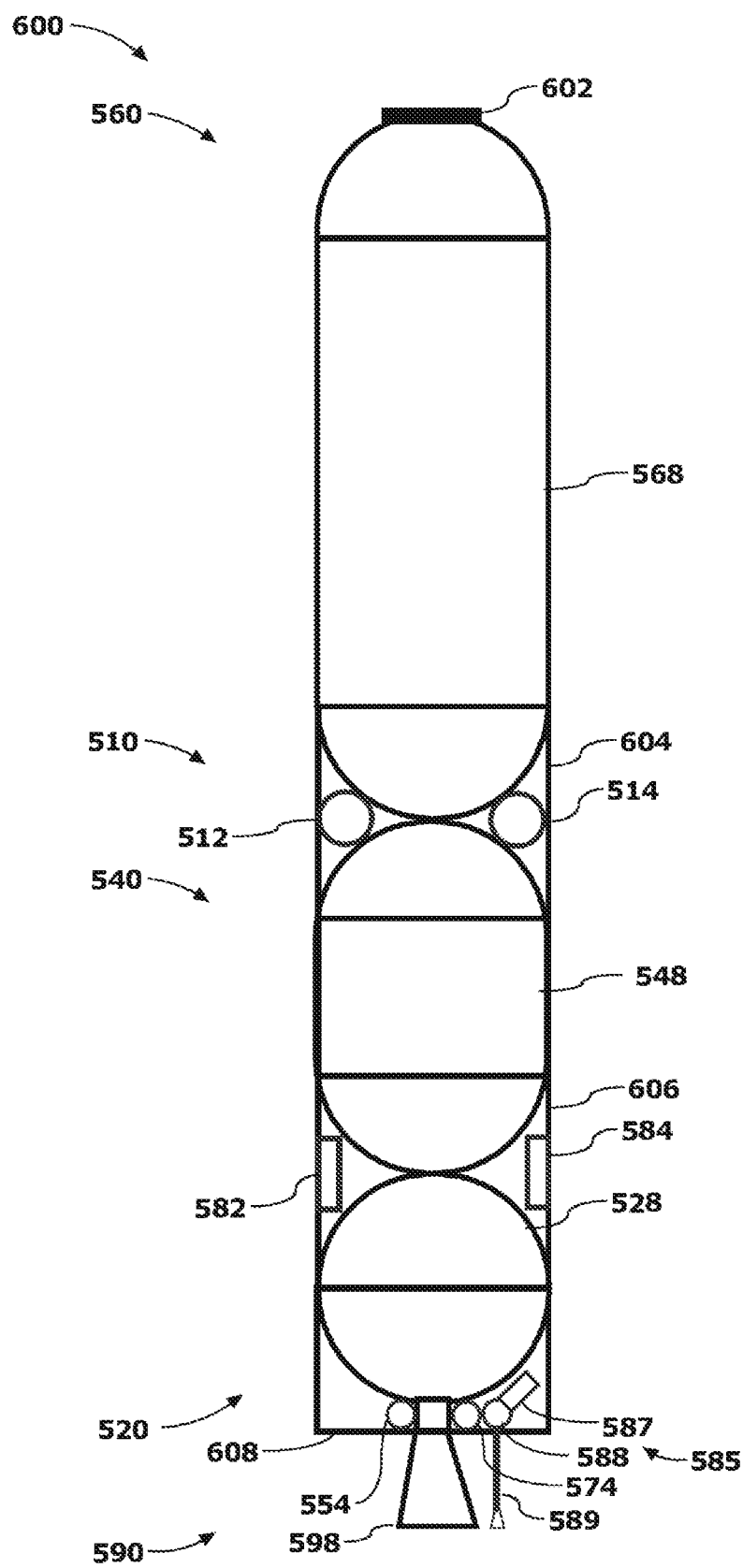
FIG. 6 is a schematic, cut-away view of the improved rocket engine system of FIG. 5, showing an example of an arrangement of the oxidizer tank, fuel tank, coolant tank, pressurizing source, two mechanical pumps, controller, power source, and gas generator plus turbine assembly in a rocket stage.

Referring to FIGS. 5 and 6, a third embodiment of the improved rocket engine system 500 includes a cooling system 520 with a coolant source, a fuel system 540 with a fuel source, an oxidizer system 560 with an oxidizer source, a propellant pressurizing system 510 with a propellant pressurizing source, a plurality of pumps, preferably two mechanical pumps 554, 574, an assembly 580 with a power source and a controller, a main rocket engine assembly 590, and a gas generator plus turbine assembly 585.

FIG. 5 shows a detailed, schematic view of the third embodiment, a two main propellant system with a gas generator pump for fuel and oxidizer and a coolant flow pressurized by a pneumatic gas. The gas generator pump is also connected to an electrical motor to assist in startup, high speed operation, restart or low power operation (throttle) or to operate as an electrical generator.

FIG. 6 shows a schematic, cut-away view of the third embodiment, and, in addition to showing other devices, parts or elements described below, shows a payload adaptor 602, a first interstage 604, a second interstage 606, and an aft skirt 608. Preferably, the payload adaptor 602, first interstage 604, second interstage 606, and aft skirt 608, respectively, are devices that are known to one of ordinary skill in the art, and are exactly the same, or substantially similar to, and provide substantially the same performance as the corresponding payload adaptor 202, 402, first interstage 204, 404, second interstage 206, 406, and aft skirt 208, 408 of the first and second embodiments. The batteries 582 may be jettisoned at convenient moments to adjust weight and balance of the stage 600.

As best shown in FIG. 5, the coolant system 520 preferably includes a coolant source, a pressure regulator 521, a check valve 522, an isolation valve 524, a vent valve 526, a coolant tank 528, a drain/fill valve and coupling 530, a feed valve 532, and a feed line 536.

Preferably, the coolant source is exactly the same, or substantially similar to, the coolant source of the first and second embodiments. The coolant source is preferably contained within the coolant tank 528, and is preferably a consumable coolant.

Preferably, the pressure regulator 521, check valve 522, isolation valve 524, vent valve 526, coolant tank 528, drain/fill valve and coupling 530, feed valve 532, and feed line 536 respectively are devices that are known to one of ordinary skill in the art, and are exactly the same, or substantially similar to, and provide substantially the same performance as the corresponding pressure regulator 121, 141, 161, 321, 341, 361, check valve 122, 142, 162, 322, 342, 362, isolation valve 124, 144, 164, 324, 344, 364, vent valve 126, 146, 166, 326, 346, 366, coolant tank 128, 328, drain/fill valve and coupling 130, 150, 170, 330, 350, 370, feed valve 132, 152, 172, 332, 352, 372, and feed line 136, 156, 176, 336, 356, 376 of the first and second embodiments.

The fuel system 540 preferably includes a fuel source, a pressure regulator 541, a check valve 542, an isolation valve 544, a vent valve 546, a fuel tank 548, a drain/fill valve and coupling 550, a feed valve 552, a mechanical pump 554, a three-way diverter valve 558 for assisting in shutdown, and a feed line 556.

Preferably, the fuel source is exactly the same, or substantially similar to, the fuel source of the first and second embodiments. The fuel source is preferably contained within the fuel tank 548, and preferably is a liquid fuel.

Preferably, the pressure regulator 541, check valve 542, isolation valve 544, vent valve 546, fuel tank 548, drain/fill valve and coupling 550, feed valve 552, mechanical pump 554, three-way diverter valve 558, and feed line 556 respectively are devices that are known to one of ordinary skill in the art, and are exactly the same, or substantially similar to, and provide substantially the same performance as the corresponding pressure regulator 121, 141, 161, 321, 341, 361, 521, check valve 122, 142, 162, 322, 342, 362, 522, isolation valve 124, 144, 164, 324, 344, 364, 524, vent valve 126, 146, 166, 326, 346, 366, 526, fuel tank 148, 348, drain/fill valve and coupling 130, 150, 170, 330, 350, 370, 530, feed valve 132, 152, 172, 332, 352, 372, 532, mechanical pump 354, 374, three-way diverter valve 358, and feed line 136, 156, 176, 336, 356, 376, 536 of the first, second and current embodiments.

The oxidizer system 560 preferably includes an oxidizer source, a pressure regulator 561, a check valve 562, an isolation valve 564, a vent valve 566, an oxidizer tank 568, a drain/fill valve and coupling 570, a feed valve 572, a mechanical pump 574, and a feed line 576.

Preferably, the oxidizer source is exactly the same, or substantially similar to, the oxidizer source of the first and second embodiments. The oxidizer source is preferably contained within the oxidizer tank 568, and is preferably a liquid oxidizer.

Preferably, the pressure regulator 561, check valve 562, isolation valve 564, vent valve 566, oxidizer tank 568, drain/fill valve and coupling 570, feed valve 572, mechanical pump 574, and feed line 576 respectively are devices that are known to one of ordinary skill in the art, and are exactly the same, or substantially similar to, and provide substantially the same performance as the corresponding pressure regulator 121, 141, 161, 321, 341, 361, 521, 541, check valve 122, 142, 162, 322, 342, 362, 522, 542, isolation valve 124, 144, 164, 324, 344, 364, 524, 544, vent valve 126, 146, 166, 326, 346, 366, 526, 546, oxidizer tank 168, 368, drain/fill valve and coupling 130, 150, 170, 330, 350, 370, 530, 550, feed valve 132, 152, 172, 332, 352, 372, 532, 552, mechanical pump 354, 374, 554, and feed line 136, 156, 176, 336, 356, 376, 536, 556 of the first, second and current embodiments.

The propellant pressurizing system 510 preferably includes a propellant pressurizing source, a pair of propellant pressurizing tanks 512, 514, a vent/fill valve and coupling 515, a relief valve 516, and a valve 517.

Preferably, the propellant pressurizing source is exactly the same, or substantially similar to, the propellant pressurizing source of the first and second embodiments. The propellant pressurizing source is preferably contained within the propellant pressurizing tanks 512, 514. The pressurizing source pressurizes the coolant tank 528, fuel tank 548, and oxidizer tank 568, via valve 517.

Preferably, the propellant pressurizing tanks 512, 514, vent/fill valve and coupling 515, relief valve 516, and valve 517 respectively are devices that are known to one of ordinary skill in the art, and are exactly the same, or substantially similar to, and provide substantially the same performance as the corresponding propellant pressurizing tank 112, 114, 312, 314, vent/fill valve and coupling 115, 315, relief valve 116, 316, and valve 117, 317 of the first and second embodiments.

The assembly 580 with a power source and a controller includes a power source 582 and a controller 584.

Preferably, the power source 582 and controller 584 are devices that are known to one of ordinary skill in the art, and are exactly the same, or substantially similar to, and provide substantially the same performance as the corresponding power source 182, 183, 382 and controller 184, 384 of the first and second embodiments. Preferably, the power source is multiple batteries 382.

The controller 584 is preferably connected to or in communication with the multiple batteries 582.

The main rocket engine assembly 590 includes throttle valves 592, a combustion chamber 594, a coolant feed line 596, a nozzle 598, and an injector (not shown).

Preferably, the throttle valves 592, combustion chamber 594, coolant feed line 596, nozzle 598, and rocket engine are devices that are known to one of ordinary skill in the art, and are exactly the same, or substantially similar to, and provide substantially the same performance as the corresponding throttle valves 192, 392, combustion chamber 194, 394, coolant feed line 196, 396, nozzle 198, 398, and rocket engine of the first and second embodiments. Preferably, the nozzle 598 is a Lobed nozzle.

The gas generator plus turbine assembly 585 includes throttle valves 586, a gas generator 587, a turbine 588, and a gas generator exhaust 589. The gas generator plus turbine assembly 585 is preferably connected to or in communication with the fuel system 540 and oxidizer system 560, and also preferably located between, connected to or in communication with mechanical pumps 554, 574. As shown in FIG. 5, the turbine 588 is located between, connected to or in communication with mechanical pumps 554, 574, connected to or in communication with the gas generator 587, and connected to or in communication with the gas generator exhaust 589.

Preferably, the throttle valves 586, gas generator 587, turbine 588, and gas generator exhaust 589 are devices that are known to one of ordinary skill in the art, and are exactly the same, or substantially similar to, and provide substantially the same performance as the corresponding throttle valves 386, gas generator 387, turbine 388, and gas generator exhaust 389 of the second embodiment.

Preferably, the mechanical pumps 554, 574 are devices that are known to one of ordinary skill in the art, and are exactly the same, or substantially similar to, and provide substantially the same performance as the corresponding pumps 354, 374 of the second embodiment.

Preferably, the pintle injector and throttleable engine of this embodiment are exactly the same, or substantially similar to, and provide substantially the same performance as the corresponding pintle injector and throttleable engine of the first and second embodiments.

Referring to FIGS. 7-10, a fourth embodiment of the improved rocket engine system 700 includes a cooling system 720 with a coolant source, a fuel system 740 with a fuel source contained within a pair of fuel tanks 748, 749, an oxidizer system 760 with an oxidizer source, a propellant pressurizing system 710 with a propellant pressurizing source, a plurality of pumps, preferably four electric pumps 734, 754, 755, 774, an assembly 780 with a power source and a controller, and a main rocket engine assembly 790. Also, the improved rocket engine system 700 further includes a pressure regulator 718, a check valve 719, and a feed line 797.

Figure 7:
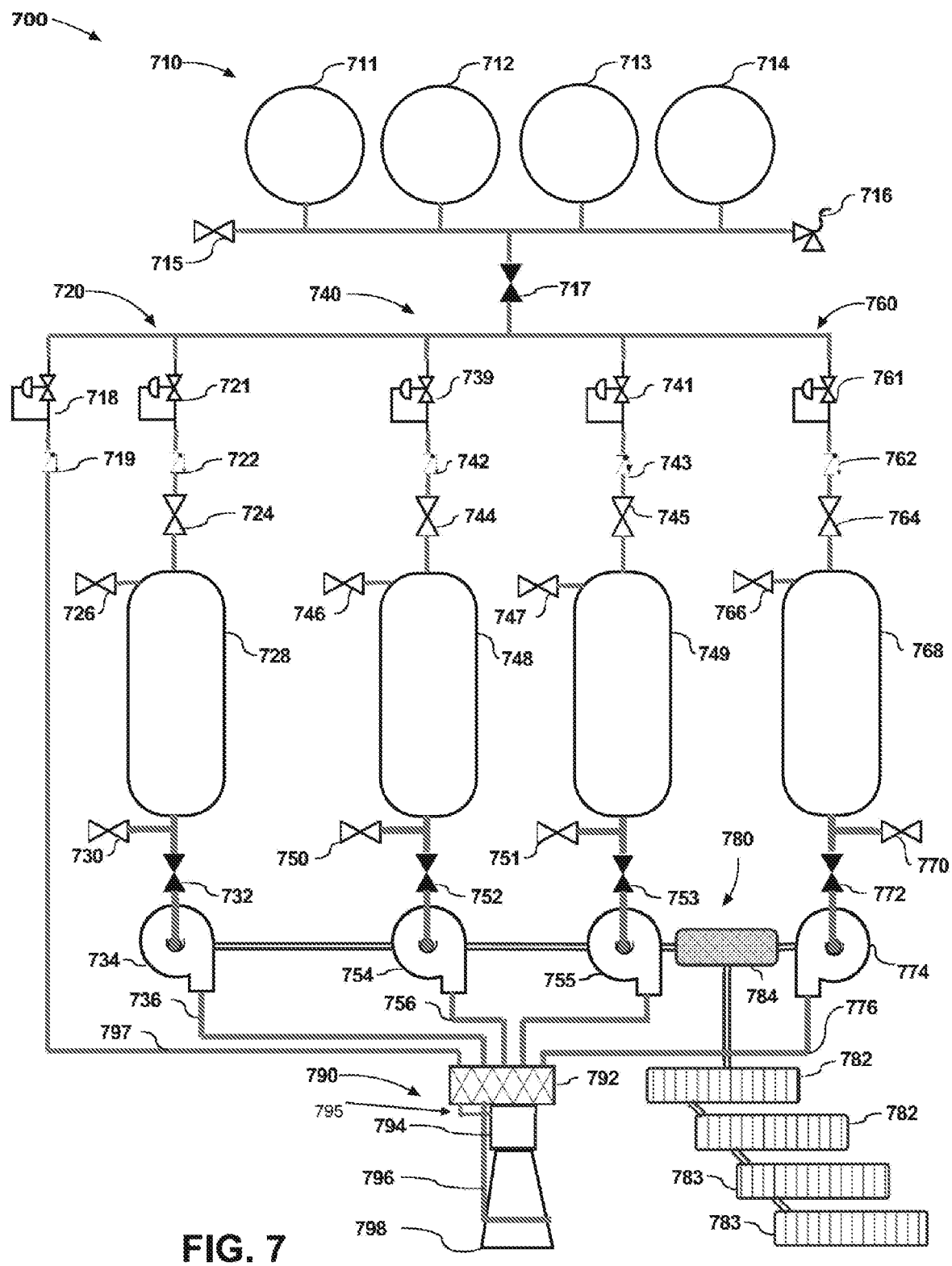
FIG. 7 is a detailed, schematic view of a fourth embodiment of an improved rocket engine system with an independently regulated cooling system according to the present invention, showing an oxidizer tank, a pair of fuel tanks, a coolant tank, four electric pumps, a controller, and a power source.

FIG. 7 shows a detailed, schematic view of the fourth embodiment, a three main propellant, consumable coolant electrically pumped system. In this instance, there would be a consumable coolant of 80/20 anhydrous ammonia/water, two fuels of kerosene and liquid hydrogen, and a liquid oxygen oxidizer. (Notably any other coolant choice may be used as a coolant and any practical choice of fuel such as propane, methane, hydrazine, and any choice of oxidizer including fluorine, nitrogen tetroxide or other chemicals may be used.)

Figure 8:
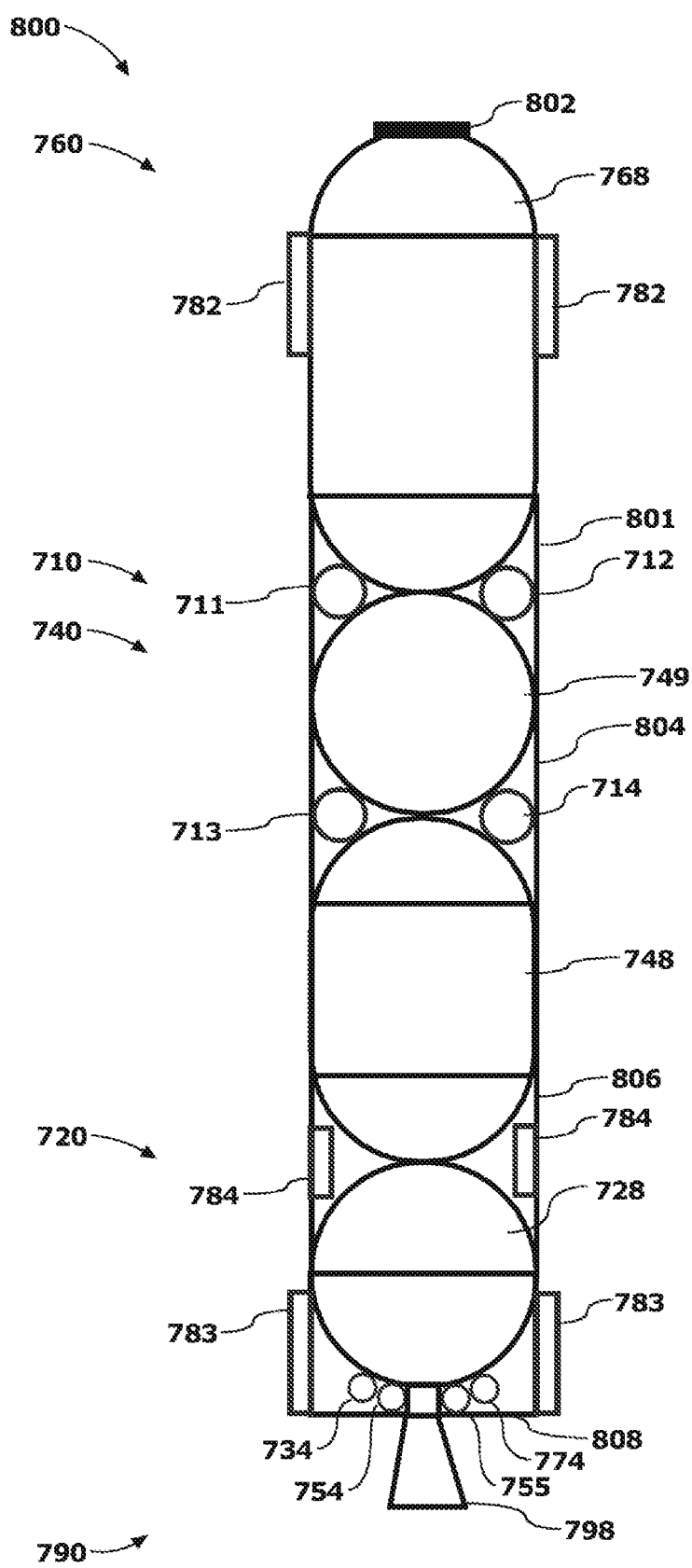
FIG. 8 is a schematic, cut-away view of the improved rocket engine system of FIG. 7, showing an example of an arrangement of the oxidizer tank, fuel tank, coolant tank, four electric pumps, controller, and power source in a rocket stage.

FIG. 8 shows a schematic, cut-away view of the fourth embodiment, and, in addition to showing other devices, parts or elements described below, shows a payload adaptor 802, a first interstage 804, a second interstage 806, and an aft skirt 808. Preferably, the payload adaptor 802, first interstage 804, second interstage 806, and aft skirt 808, respectively, are devices that are known to one of ordinary skill in the art, and are exactly the same, or substantially similar to, and provide substantially the same performance as the corresponding payload adaptor 202, 402, 602, first interstage 204, 404, 604, second interstage 206, 406, 606, and aft skirt 208, 408, 608 of the first, second and third embodiments. The batteries 782, 783 may be jettisoned at convenient moments to adjust weight and balance of the stage 800.

As best shown in FIG. 7, the cooling system 720 preferably includes a coolant source, a pressure regulator 721, a check valve 722, an isolation valve 724, a vent valve 726, a coolant tank 728, a drain/fill valve and coupling 730, a feed valve 732, and a feed line 736.

Preferably, the coolant source is exactly the same, or substantially similar to, the coolant source of the first, second and third embodiments. The coolant source is preferably contained within the coolant tank 728, and is preferably a consumable coolant.

Preferably, the pressure regulators 718, 721, check valves 719, 722, isolation valve 724, vent valve 726, coolant tank 728, drain/fill valve and coupling 730, feed valve 732, and feed line 736 respectively are devices that are known to one of ordinary skill in the art, and are exactly the same, or substantially similar to, and provide substantially the same performance as the corresponding pressure regulator 121, 141, 161, 321, 341, 361, 521, 541, 561, check valve 122, 142, 162, 322, 342, 362, 522, 542, 562, isolation valve 124, 144, 164, 324, 344, 364, 524, 544, 564, vent valve 126, 146, 166, 326, 346, 366, 526, 546, 566, coolant tank 128, 328, 528, drain/fill valve and coupling 130, 150, 170, 330, 350, 370, 530, 550, 570, feed valve 132, 152, 172, 332, 352, 372, 532, 552, 572, and feed line 136, 156, 176, 336, 356, 376, 536, 556, 576 of the first, second and third embodiments.

The fuel system 740 preferably includes a pair of fuel tanks 748, 749 containing a fuel source, a pair of pressure regulators 739, 741, a pair of check valves 742, 743, a pair of isolation valves 744, 745, a pair of vent valves 746, 747, a pair of drain/fill valves and couplings 750, 751, a pair of feed valves 752, 753, a pair of electric pumps 754, 755, and a pair of feed lines 756.

Preferably, the fuel source is exactly the same, or substantially similar to, the fuel source of the first, second and third embodiments. The fuel source is preferably contained within the fuel tanks 748, 749, and preferably is a liquid fuel.

Preferably, the pressure regulators 739, 741, check valves 742, 742, isolation valves 744, 745, vent valves 746, 747, fuel tanks 748, 749, drain/fill valves and couplings 750, 751, feed valves 752, 753, electric pumps 754, 755, and feed lines 756 respectively are devices that are known to one of ordinary skill in the art, and are exactly the same, or substantially similar to, and provide substantially the same performance as the corresponding pressure regulators 121, 141, 161, 321, 341, 361, 521, 541, 561, 718, 721, check valves 122, 142, 162, 322, 342, 362, 522, 542, 562, 719, 722, isolation valve 124, 144, 164, 324, 344, 364, 524, 544, 564, 724, vent valve 126, 146, 166, 326, 346, 366, 526, 546, 566, 726, fuel tank 148, 348, 548, drain/fill valve and coupling 130, 150, 170, 330, 350, 370, 530, 550, 570, 730, feed valve 132, 152, 172, 332, 352, 372, 532, 552, 572, 732, electric pump 134, 154, 174, 334, 734, and feed line 136, 156, 176, 336, 356, 376, 536, 556, 576, 736 of the first, second, third and current embodiments.

The oxidizer system 760 preferably includes an oxidizer source, a pressure regulator 761, a check valve 762, an isolation valve 764, a vent valve 766, an oxidizer tank 768, a drain/fill valve and coupling 770, a feed valve 772, an electric pump 774, and a feed line 776.

Preferably, the oxidizer source is exactly the same, or substantially similar to, the oxidizer source of the first, second and third embodiments. The oxidizer source is preferably contained within the oxidizer tank 768, and is preferably a liquid oxidizer.

Preferably, the pressure regulator 761, check valve 762, isolation valve 764, vent valve 766, oxidizer tank 768, drain/fill valve and coupling 770, feed valve 772, electric pump 774, and feed line 776 respectively are devices that are known to one of ordinary skill in the art, and are exactly the same, or substantially similar to, and provide substantially the same performance as the corresponding pressure regulator 121, 141, 161, 321, 341, 361, 521, 541, 561, 718, 721, 739, 741, check valve 122, 142, 162, 322, 342, 362, 522, 542, 562, 719, 722, 742, 743, isolation valve 124, 144, 164, 324, 344, 364, 524, 544, 564, 724, 744, 745, vent valve 126, 146, 166, 326, 346, 366, 526, 546, 566, 726, 746, 747, oxidizer tank 168, 368, 568, drain/fill valve and coupling 130, 150, 170, 330, 350, 370, 530, 550, 570, 730, 750, 751, feed valve 132, 152, 172, 332, 352, 372, 532, 552, 572, 732, 752, 753, electric pump 134, 154, 174, 334, 734, 754, 755, and feed line 136, 156, 176, 336, 356, 376, 536, 556, 576, 736, 756, 797 of the first, second, third and current embodiments.

The propellant pressurizing system 710 preferably includes a propellant pressurizing source, a plurality of propellant pressurizing tanks 711, 712, 713, 714, a vent/fill valve and coupling 715, a relief valve 716, and a valve 717.

Preferably, the propellant pressurizing source is exactly the same, or substantially similar to, the propellant pressurizing source of the first, second and third embodiments. The propellant pressurizing source is preferably contained within the propellant pressurizing tanks 711, 712, 713, 714. The pressurizing source pressurizes the coolant tank 728, fuel tanks 748, 749, and oxidizer tank 768, via valve 717.

Preferably, the propellant pressurizing tanks 711, 712, 713, 714, vent/fill valve and coupling 715, relief valve 716, and valve 717 respectively are devices that are known to one of ordinary skill in the art, and are exactly the same, or substantially similar to, and provide substantially the same performance as the corresponding propellant pressurizing tank 112, 114, 312, 314, 512, 514, vent/fill valve and coupling 115, 315, 515, relief valve 116, 316, 516, and valve 117, 317, 517 of the first, second and third embodiments.

The assembly 780 with a power source and a controller includes a power source 782, 783 and a controller 784.

Preferably, the power source 782, 783 and controller 784 are devices that are known to one of ordinary skill in the art, and are exactly the same, or substantially similar to, and provide substantially the same performance as the corresponding power source 182, 183, 382, 582 and controller 184, 384, 584 of the first embodiment. Preferably, the power source is multiple batteries 782, 783.

The controller 784 is preferably connected to or in communication with the multiple batteries 782, 783.

The main rocket engine assembly 790 includes throttle valves 792, a combustion chamber 794, a coolant feed line 796, a nozzle 798, and an injector (not shown).

Preferably, the throttle valves 792, combustion chamber 794, coolant feed line 796, nozzle 798, and rocket engine are devices that are known to one of ordinary skill in the art, and are exactly the same, or substantially similar to, and provide substantially the same performance as the corresponding throttle valves 192, 392, 592, combustion chamber 194, 394, 594, coolant feed line 196, 396, 596, nozzle 198, 398, 598, and rocket engine of the first, second and third embodiments. Preferably, the nozzle 798 is a Lobed nozzle.

Preferably, the electric pumps 734, 754, 755, 774 are devices that are known to one of ordinary skill in the art, and are exactly the same, or substantially similar to, and provide substantially the same performance as the corresponding pumps 134, 154, 174, 334 of the first, second and third embodiments.

Preferably, the pintle injector and throttleable engine of this embodiment are exactly the same, or substantially similar to, and provide substantially the same performance as the corresponding pintle injector and throttleable engine of the first, second and third embodiments.

Figure 9:
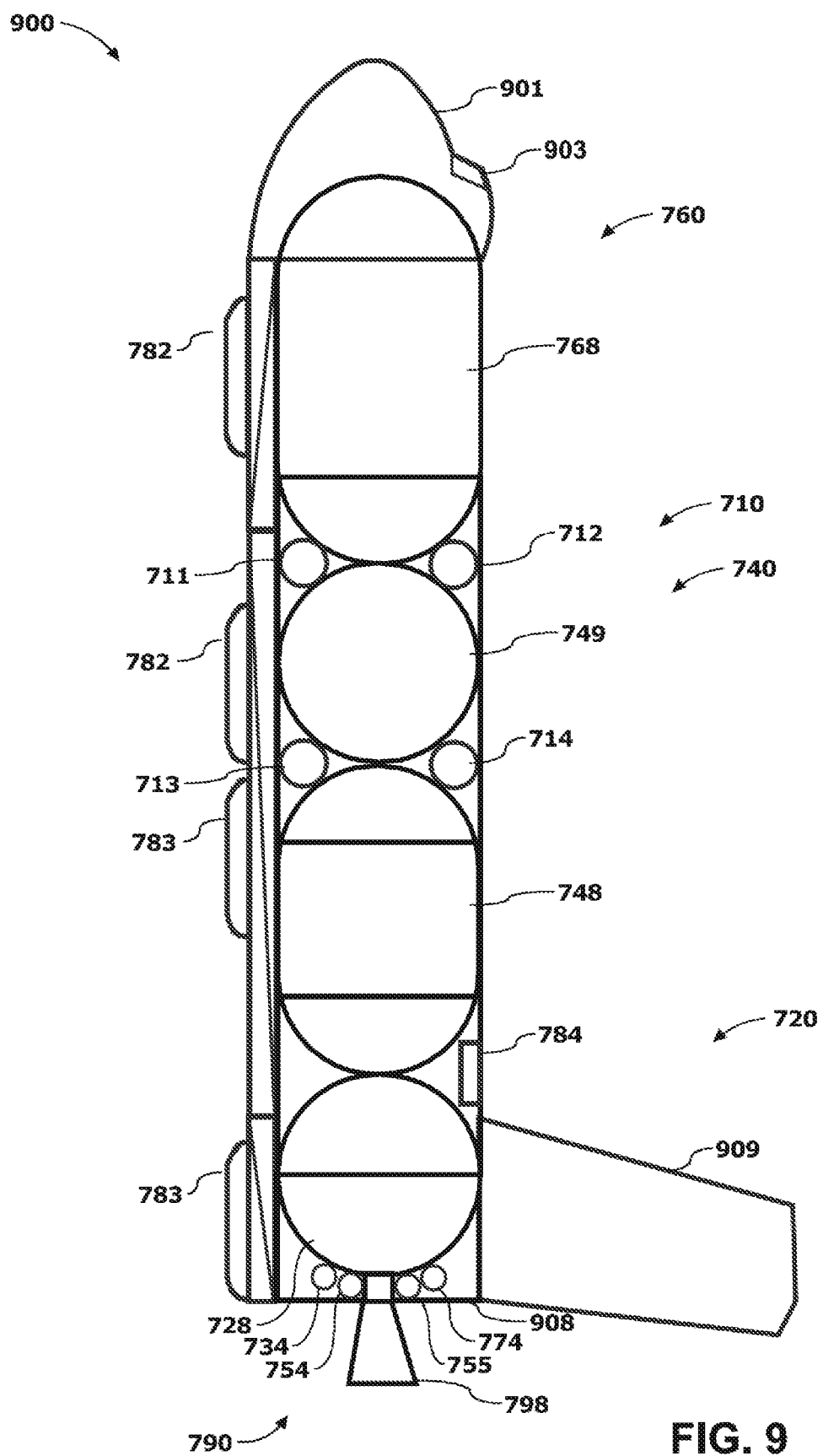
FIG. 9 is a schematic, cut-away view of the improved rocket engine system of FIG. 7, showing an example of an arrangement of the oxidizer tank, fuel tank, coolant tank, four electric pumps, controller, and power source in a winged rocketplane.

FIG. 9 shows a schematic, cut-away view of the fourth embodiment, and, in addition to showing other devices, parts or elements described above, shows the fourth embodiment applied to a winged rocketplane. In this instance, there would be a consumable coolant of 80/20 anhydrous ammonia. The batteries 782, 783 may be jettisoned at convenient moments to adjust weight and balance of the system.

Figure 10:
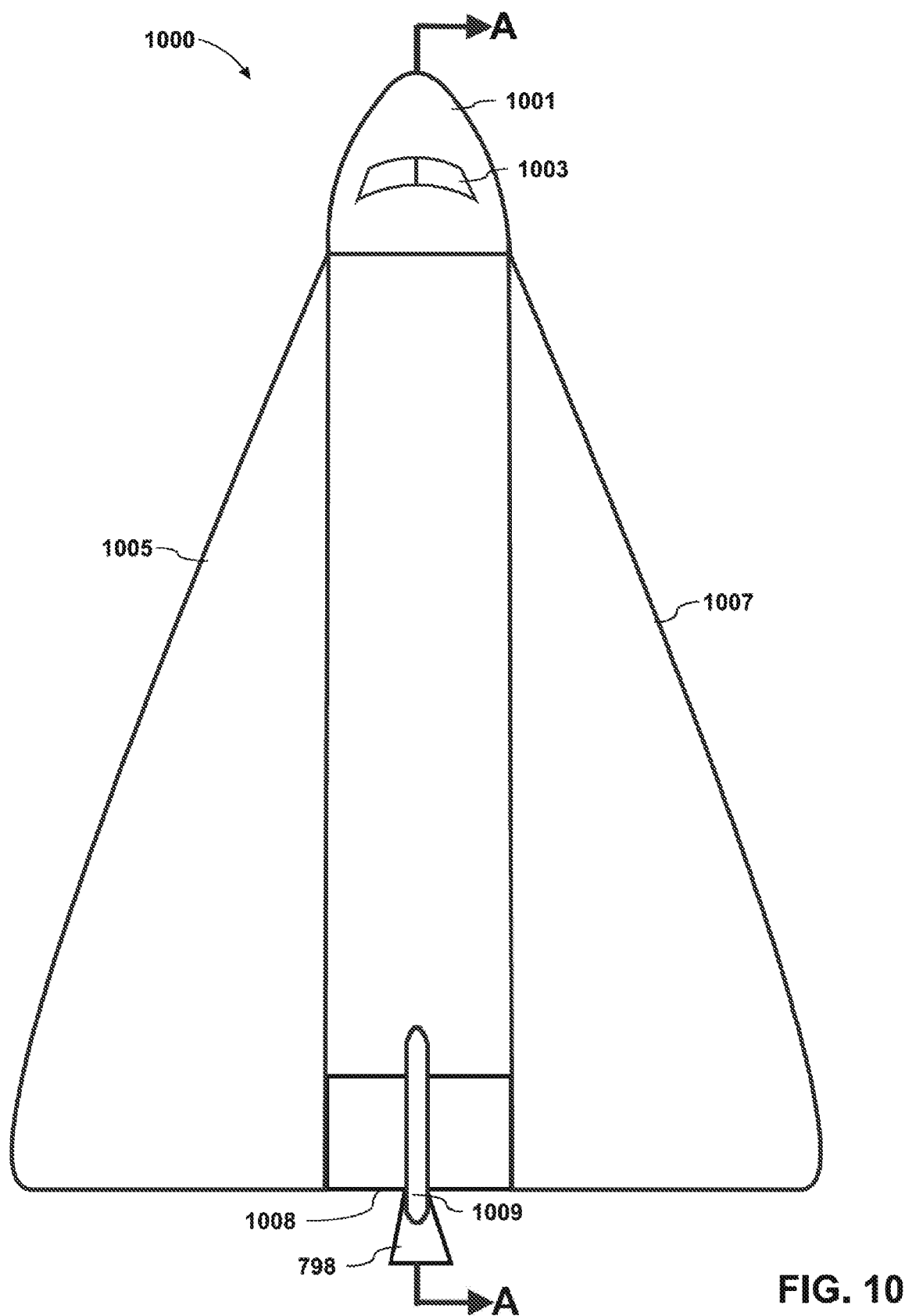
FIG. 10 is a top view of the winged rocketplane of FIG. 9.

FIG. 10 shows a top view of a winged rocketplane.

As non-limiting examples, the improved rocket engine system of the embodiments described above may be attached or applied to an expendable rocket stage (such as, but not limited to, a first stage, a second stage, a third stage, and/or a launch escape tower), a reusable flight or space launch vehicle, a hypersonic flight vehicle, any combination thereof, other space vehicles or other vehicles known by one of ordinary skill in the art.

As a non-limiting example and in the instance when jettisoning of batteries, or of another power source, are involved or takes place, at least one electric power source may perform at greater than 1,000 kw. Also, as a non-limiting example and in the instance when the improved rocket engine system may be attached or applied to a reusable flight or space launch vehicle, at least one electric power source may perform at greater than 1,000 kw.

As non-limiting examples, the improved rocket engine system of the embodiments described above may also be applied to the following circumstances:

1) an electro-cycle engine, under 1000 kw and with or without jettisoning; 2) an electro-cycle engine, over 1000 kw and with jettisoning; 3) a planetary lander, with or without jettisoning; 4) an expendable upper stage with or without jettisoning, and over 1000 kw with jettisonning; 5) an in-space tug, with or without jettisoning; 6) a first stage booster with jettisoning above 1000 kw, and below 1000 kw with or without jettisoning; 7) a reusable space launch vehicle; 8) a winged rocketplane; 9) a land vehicle; and 10) a transport vehicle.

It is to be understood that the present invention is not limited to the embodiments described above or as shown in the attached figures, but encompasses any and all embodiments within the spirit of the invention.

The invention claimed is:

1. An improved rocket engine system comprising:
   a rocket engine comprising a combustion chamber, a nozzle, and an injector;
   a consumable coolant source configured to inject a consumable coolant into the combustion chamber of the rocket engine, and provide cooling to at least a portion of the rocket engine;
   a propellant source in fluid communication with the combustion chamber and comprising a propellant;
   a flow controller configured for independent control of a flow of the consumable coolant relative to a flow of the propellant;
   a first pump configured to feed the propellant into the combustion chamber;
   a plurality of power sources coupled to the first pump and configured to jettison at least one of the plurality of power sources from the rocket engine;
   a second pump configured to feed the consumable coolant into the combustion chamber and the cooling system configured to cool to at least a portion of the rocket engine; and
   a second plurality of power sources coupled to the second pump and configured to jettison at least one of the plurality of power sources from the rocket engine.

2. The improved rocket engine system according to claim 1, further comprising:
   a controller in communication with the power sources and the pumps, wherein the plurality of power sources is configured to power the first pump and the second plurality of power sources is configured to power the second pump.

3. The improved rocket engine system according to claim 1, further comprising a pressurizing source in fluid communication with the coolant source and configured to feed the consumable coolant into the combustion chamber and the cooling system configured to cool to at least a portion of the rocket engine.

4. The improved rocket engine system according to claim 1, wherein said coolant source is consumable and adds to the energy of combustion.

5. The improved rocket engine system according to claim 1, wherein the first pump is an electrical turbopump providing a range of fluid pumping conditions of 10% thrust to 100% thrust.

6. The improved rocket engine system according to claim 1, further comprising a propellant pressurizing source configured to pressurize said propellant source.

7. The improved rocket engine system according to claim 1, further comprising a gas generator comprising a turbine assembly.

8. A rocket stage comprising said improved rocket engine system of claim 1.

9. The improved rocket engine system according to claim 1, further comprising an auxiliary thruster in communication with said propellant source and configured to provide ullage forces or altitude control.

10. The improved rocket engine system according to claim 9, wherein the auxiliary thruster is in communication with said consumable coolant source and is configured to provide thrust by burning a combination of the propellant and the consumable coolant.

11. The improved rocket engine system according to claim 1, wherein the plurality of power sources is a plurality of individual batteries and the second plurality of power sources is a second plurality of individual batteries.

12. The improved rocket engine system according to claim 11, wherein the jettison of at least one of the plurality of power sources from the rocket engine is a jettison of at least one individual battery from the plurality of individual batteries from the rocket engine.

13. The improved rocket engine system according to claim 11, wherein the jettison of at least one of the second plurality of power sources from the rocket engine is a jettison of at least one individual battery from the second plurality of individual batteries from the rocket engine.

14. A rocket engine system comprising:
   a rocket engine comprising a combustion chamber having an injector, and a nozzle in fluid communication with the combustion chamber;
   a first propellant source in communication with the combustion chamber and comprising a first propellant;
   a second propellant source in communication with the combustion chamber and comprising a second propellant;
   a consumable coolant source in communication with the combustion chamber and a cooling system configured to cool to at least a portion of the rocket engine;
   a coolant flow controller configured for independent control of a flow of a consumable coolant from the consumable coolant source relative to a flow of at least one of the first propellant and the second propellant;
   at least one pump configured to feed the first propellant and the second propellant into the combustion chamber;
   a plurality of power sources coupled to the at least one pump and configured to jettison at least one of the plurality of power sources from the rocket engine system;

a second pump configured to feed the consumable coolant into the combustion chamber and the cooling system configured to cool to at least a portion of the rocket engine; and a second plurality of power sources coupled to the second pump and configured to jettison at least one of the second plurality of power sources from the rocket engine.

15. The improved rocket engine system according to claim 14, wherein the plurality of power sources is a plurality of individual batteries;

wherein the jettison of at least one of the plurality of power sources from the rocket engine is a jettison of at least one individual battery from the plurality of individual batteries from the rocket engine;

wherein the second plurality of power sources is a second plurality of individual batteries; and wherein the jettison of at least one of the second plurality of power sources from the rocket engine is a jettison of at least one individual battery from the second plurality of individual batteries from the rocket engine.

16. The rocket engine system according to claim 14, further comprising:

an oxidizer source in fluid communication with the combustion chamber and comprising an oxidizer;

a third pump configured to feed the oxidizer into the combustion chamber; and a third plurality of power sources coupled to the third pump and configured to jettison at least one of the third plurality of power sources from the rocket engine.

17. The rocket engine system according to claim 16, wherein said consumable coolant is a third propellant and is fed into both of the combustion chamber and the cooling system configured to cool to at least a portion of the rocket engine.

18. The improved rocket engine system according to claim 16, wherein the third plurality of power sources is a third plurality of individual batteries; and wherein the jettison of at least one of the third plurality of power sources from the rocket engine is a jettison of at least one individual battery from the third plurality of individual batteries from the rocket engine.

* * * * *